(12) United States Patent
Girard et al.

(10) Patent No.: US 8,204,432 B2
(45) Date of Patent: *Jun. 19, 2012

(54) SYSTEM AND METHOD FOR RECEIVING BROADCAST CONTENT ON A MOBILE PLATFORM DURING INTERNATIONAL TRAVEL

(75) Inventors: Lawrence E. Girard, Huntington Beach, CA (US); Paul Anthony Margis, Irvine, CA (US); Eric Moyer, Huntington Beach, CA (US); Dennis Rilea, Foothill Ranch, CA (US)

(73) Assignee: Panasonic Avionics Corporation, Lake Forest, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/727,673

(22) Filed: Mar. 19, 2010

(65) Prior Publication Data

US 2010/0180299 A1 Jul. 15, 2010

Related U.S. Application Data

(63) Continuation of application No. 11/269,378, filed on Nov. 7, 2005, now Pat. No. 7,715,783.

(60) Provisional application No. 60/625,497, filed on Nov. 5, 2004.

(51) Int. Cl.
*H04H 20/74* (2008.01)

(52) U.S. Cl. ......................................... 455/3.02; 725/73

(58) Field of Classification Search ........ 455/3.01–3.06, 455/456.3, 427, 429–431, 12.1, 13.3; 725/73, 725/76; 343/850–865
See application file for complete search history.

(56) References Cited

U.S. PATENT DOCUMENTS

| | | | |
|---|---|---|---|
| 5,463,656 A | 10/1995 | Polivka et al. | |
| 5,596,647 A | 1/1997 | Wakai et al. | |
| 5,617,331 A | 4/1997 | Wakai et al. | |
| 5,760,819 A | 6/1998 | Sklar et al. | |

(Continued)

FOREIGN PATENT DOCUMENTS

EP 1217833 A2 6/2002

(Continued)

OTHER PUBLICATIONS

Office Action, U.S. Appl. No. 11/269,378, Aug. 20, 2008.

(Continued)

*Primary Examiner* — Nay A Maung
*Assistant Examiner* — Angelica Perez
(74) *Attorney, Agent, or Firm* — Orrick, Herrington & Sutcliffe LLP

(57) ABSTRACT

A vehicle information system for passenger vehicles, such as automobiles and aircraft, and methods for manufacturing and using same. The vehicle information system includes a multi-regional antenna subsystem and a multi-regional receiver system for receiving viewing content provided by diverse content sources during travel, including international travel. The multi-regional antenna and receiver system provide selected viewing content for distribution throughout the vehicle information system and presentation via one or more passenger interfaces. As the vehicle approaches the coverage region of a selected content source, the vehicle information system automatically reconfigures the multi-regional antenna and receiver system to receive viewing content from the content source without requiring manual adjustment to, or replacement of, the multi-regional antenna subsystem and/or receiver system. Passengers traveling aboard the vehicle thereby can continuously enjoy the viewing content during travel with limited interruption in service and without unwanted travel delays.

65 Claims, 23 Drawing Sheets

U.S. PATENT DOCUMENTS

| | | | |
|---|---|---|---|
| 5,790,175 | A | 8/1998 | Sklar et al. |
| 5,801,751 | A | 9/1998 | Sklar et al. |
| 5,889,775 | A | 3/1999 | Sawicz et al. |
| 5,929,895 | A | 7/1999 | Berry et al. |
| 5,953,429 | A | 9/1999 | Wakai et al. |
| 5,959,596 | A | 9/1999 | McCarten et al. |
| 5,966,442 | A | 10/1999 | Sachdev |
| 5,990,928 | A | 11/1999 | Sklar et al. |
| 6,201,797 | B1 | 3/2001 | Leuca et al. |
| 6,208,307 | B1 | 3/2001 | Frisco et al. |
| 6,249,913 | B1 | 6/2001 | Galipeau et al. |
| 6,499,027 | B1 | 12/2002 | Weinberger |
| 6,529,706 | B1 | 3/2003 | Mitchell |
| 6,741,841 | B1 | 5/2004 | Mitchell |
| 6,748,597 | B1 | 6/2004 | Frisco et al. |
| 6,757,712 | B1 | 6/2004 | Bastian et al. |
| 6,782,392 | B1 | 8/2004 | Weinberger et al. |
| 6,807,148 | B1 | 10/2004 | Eicher |
| 6,807,538 | B1 | 10/2004 | Weinberger et al. |
| 6,810,527 | B1 | 10/2004 | Conrad et al. |
| 6,876,905 | B2 | 4/2005 | Farley et al. |
| 6,885,863 | B2 | 4/2005 | Parkman et al. |
| 6,899,390 | B2 | 5/2005 | Sanfrod et al. |
| 6,947,726 | B2 * | 9/2005 | Rockwell ............... 455/411 |
| 7,124,426 | B1 | 10/2006 | Tsuria et al. |
| 2002/0059614 | A1 | 5/2002 | Lipsanen et al. |
| 2002/0087992 | A1 | 7/2002 | Bengeult et al. |
| 2002/0152470 | A1 * | 10/2002 | Hammond ............... 725/76 |
| 2002/0170060 | A1 | 11/2002 | Lyman |
| 2003/0043760 | A1 | 3/2003 | Taylor |
| 2003/0055975 | A1 | 3/2003 | Nelson et al. |
| 2003/0069015 | A1 | 4/2003 | Brinkley et al. |
| 2003/0084451 | A1 | 5/2003 | Pierzga et al. |
| 2003/0085818 | A1 | 5/2003 | Renton et al. |
| 2003/0093798 | A1 | 5/2003 | Rogerson |
| 2003/0160710 | A1 | 8/2003 | Baumgartner et al. |
| 2003/0184449 | A1 | 10/2003 | Baumgartner et al. |
| 2003/0217363 | A1 | 11/2003 | Brady, Jr. et al. |
| 2004/0078821 | A1 | 4/2004 | Frisco et al. |
| 2004/0098745 | A1 | 5/2004 | Marston et al. |
| 2004/0108963 | A1 | 6/2004 | Clymer et al. |
| 2004/0123322 | A1 * | 6/2004 | Erkocevic et al. ........... 725/81 |
| 2004/0183346 | A1 | 9/2004 | Sanford et al. |
| 2004/0235469 | A1 | 11/2004 | Krug |
| 2004/0252965 | A1 | 12/2004 | Moreno et al. |
| 2004/0252966 | A1 | 12/2004 | Holloway et al. |
| 2005/0171653 | A1 * | 8/2005 | Taylor ............... 701/13 |
| 2005/0278753 | A1 | 12/2005 | Brady, Jr. et al. |
| 2005/0278754 | A1 | 12/2005 | Bleacher et al. |
| 2006/0183450 | A1 * | 8/2006 | Cameron ............... 455/226.2 |

FOREIGN PATENT DOCUMENTS

| | | | |
|---|---|---|---|
| EP | | 1217833 A3 | 4/2004 |

OTHER PUBLICATIONS

Final Office Action, U.S. Appl. No. 11/269,378, Apr. 28, 2009.

Notice of Allowance, U.S. Appl. No. 11/269,378, Jan. 5, 2010.

* cited by examiner

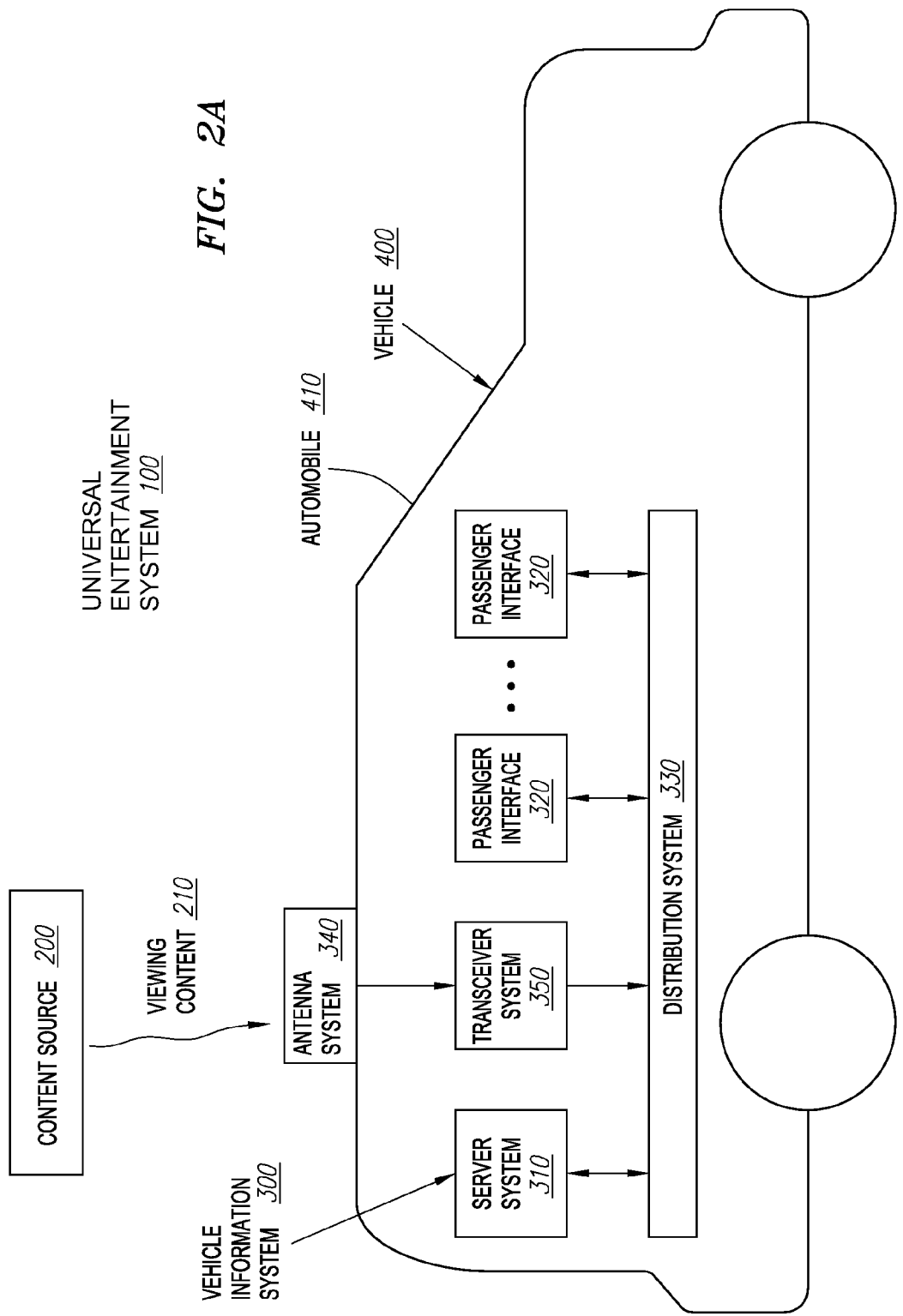

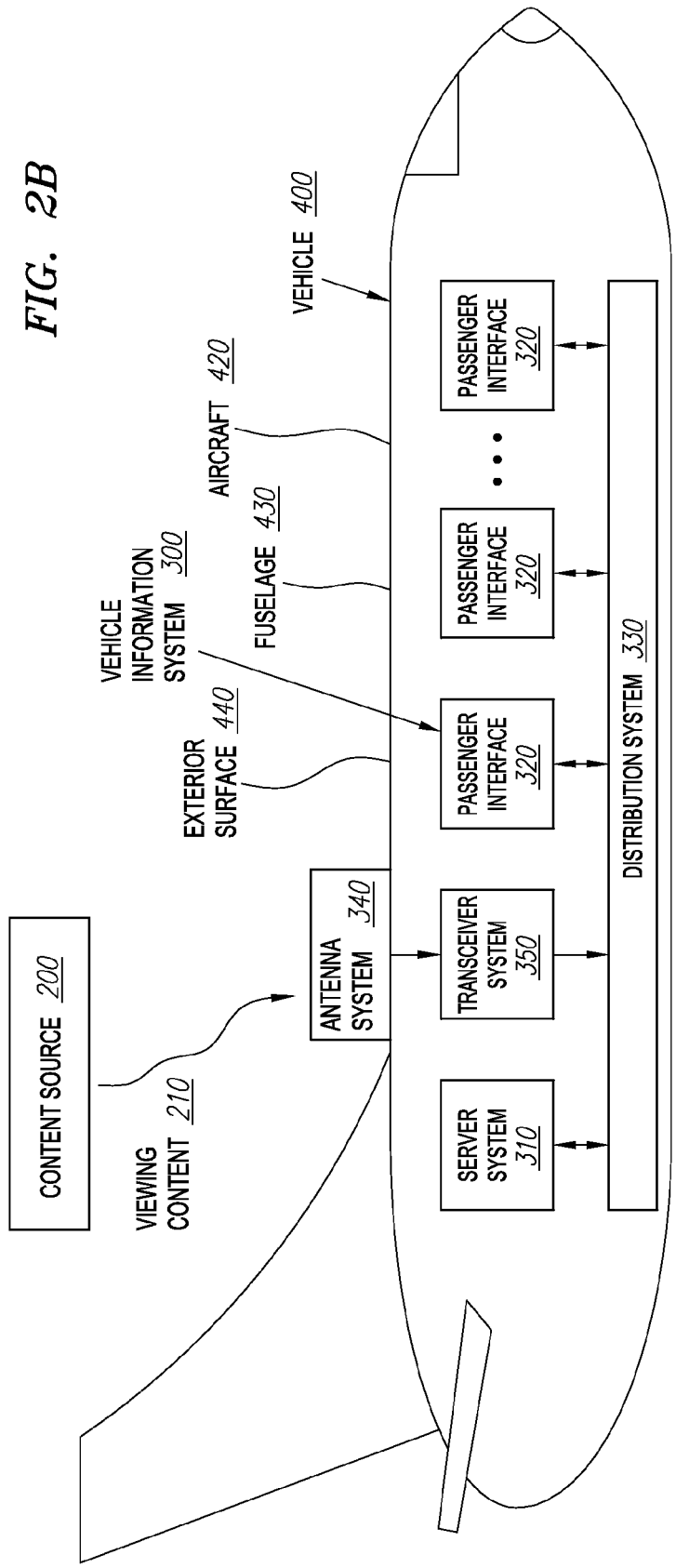

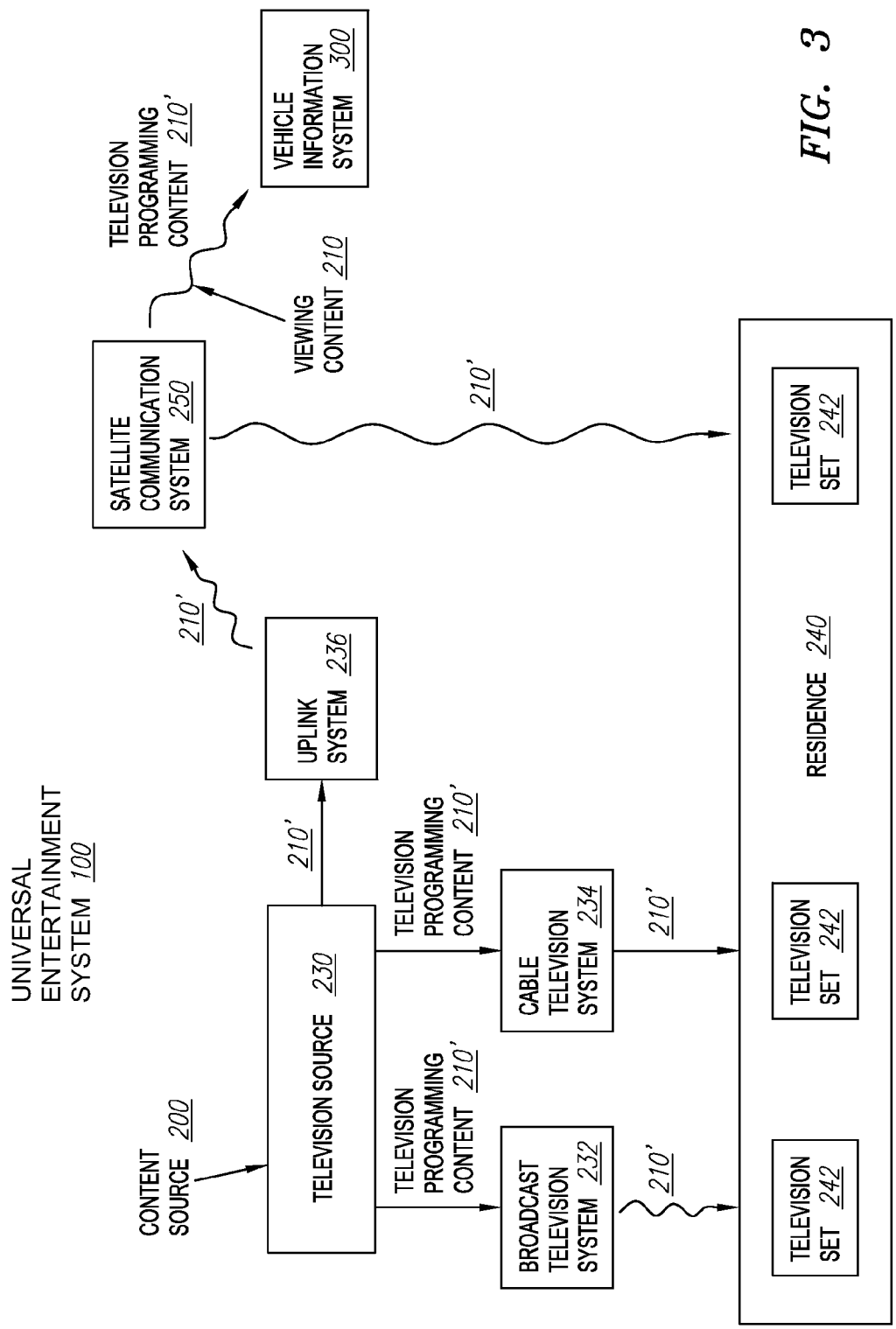

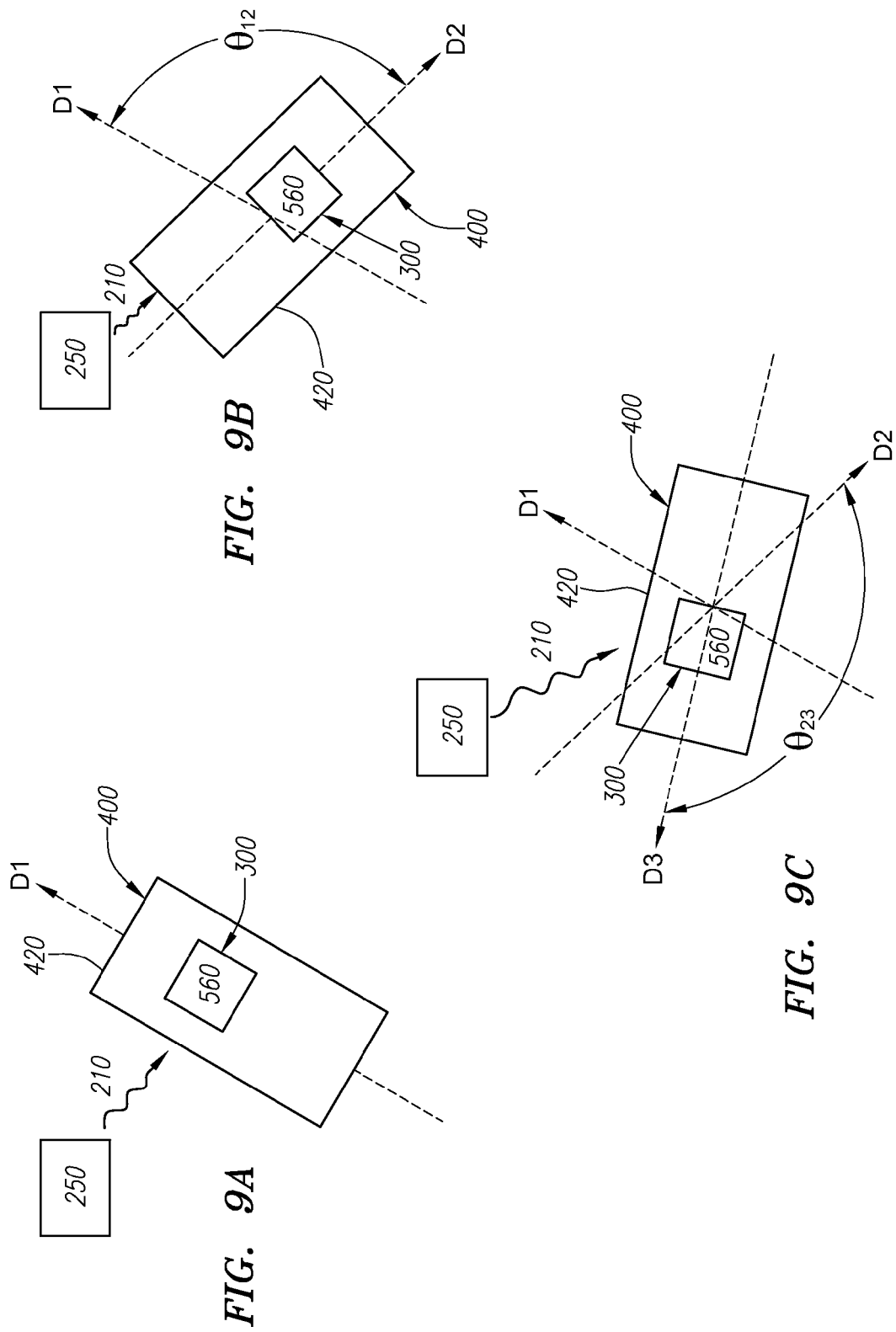

SYSTEM AND METHOD FOR RECEIVING BROADCAST CONTENT ON A MOBILE PLATFORM DURING INTERNATIONAL TRAVEL

CROSS-REFERENCE TO RELATED APPLICATIONS

This application is a continuation application of U.S. Nonprovisional application Ser. No. 11/269,378, filed on Nov. 7, 2005, now U.S. Pat. No. 7,715,783 which claims the benefit of U.S. Provisional Application Ser. No. 60/625,497, filed on Nov. 5, 2004. Priority to each of the prior applications is expressly claimed, and the disclosures of the applications are hereby incorporated herein by reference in their entireties.

FIELD

The present disclosure relates generally to portable information systems and more particularly, but not exclusively, to passenger entertainment systems installed aboard mobile platforms.

BACKGROUND

Passenger vehicles, such as automobiles and aircraft, often provide entertainment systems to satisfy passenger demand for entertainment during travel.

Conventional passenger entertainment systems typically include video display systems, such as overhead cabin display systems or seatback display systems, and audio presentation systems, such as overhead speaker systems or headphones, for presenting viewing content. Individual controls also can be provided at the passenger seats for selecting viewing content for presentation. Including audio and video materials, the viewing content can be derived from a variety of content sources. For example, prerecorded viewing content, such as motion pictures and music, can be provided by internal sources, such as audio and video players, that are installed in the vehicle. The conventional passenger entertainment systems likewise can include antenna and receiver systems for receiving viewing content, such as live television programming, transmitted from one or more external content providers (or sources).

Such conventional passenger entertainment systems, however, suffer from many disadvantages. Installation of conventional passenger entertainment systems, for instance, can involve the addition of a significant amount of weight to the vehicle. The fuel economy of the vehicle thereby can be adversely affected. Also, conventional passenger entertainment systems provide limited viewing content and limited communications between the vehicle and the external content sources, particularly during travel.

When installed on vehicles, such as aircraft, that travel internationally, conventional passenger entertainment systems further require frequent adjustments or changes during travel. If the passenger entertainment system has an antenna system for receiving direct broadcast satellite (DBS) television programming, for example, the antenna system must be adjusted or replaced with a different antenna system upon entering each new geographic region to receive viewing content within the new geographic region. The need to make adjustments or changes to the antenna system is not only inconvenient for vehicle operators, but also to the passengers by disrupting reception of the viewing content and causing unwanted travel delays.

In view of the foregoing, a need exists for an improved passenger entertainment system that overcomes the aforementioned obstacles and deficiencies of currently-available passenger entertainment systems.

BRIEF DESCRIPTION OF THE DRAWINGS

FIG. 2A is an exemplary block diagram illustrating an embodiment of the universal entertainment system of FIG. 1 in which the vehicle information system is installed in an automobile.

FIG. 2B is an exemplary block diagram illustrating an alternative embodiment of the universal entertainment system of FIG. 1 in which the vehicle information system is installed in an aircraft.

FIG. 3 is an exemplary top-level block diagram illustrating another alternative embodiment of the universal entertainment system of FIG. 1, wherein at least one content source comprises a television source for providing television programming content via a satellite communication system.

8A, wherein the multi-regional antenna subsystem is configured for installation aboard an aircraft.

Figure 8A:
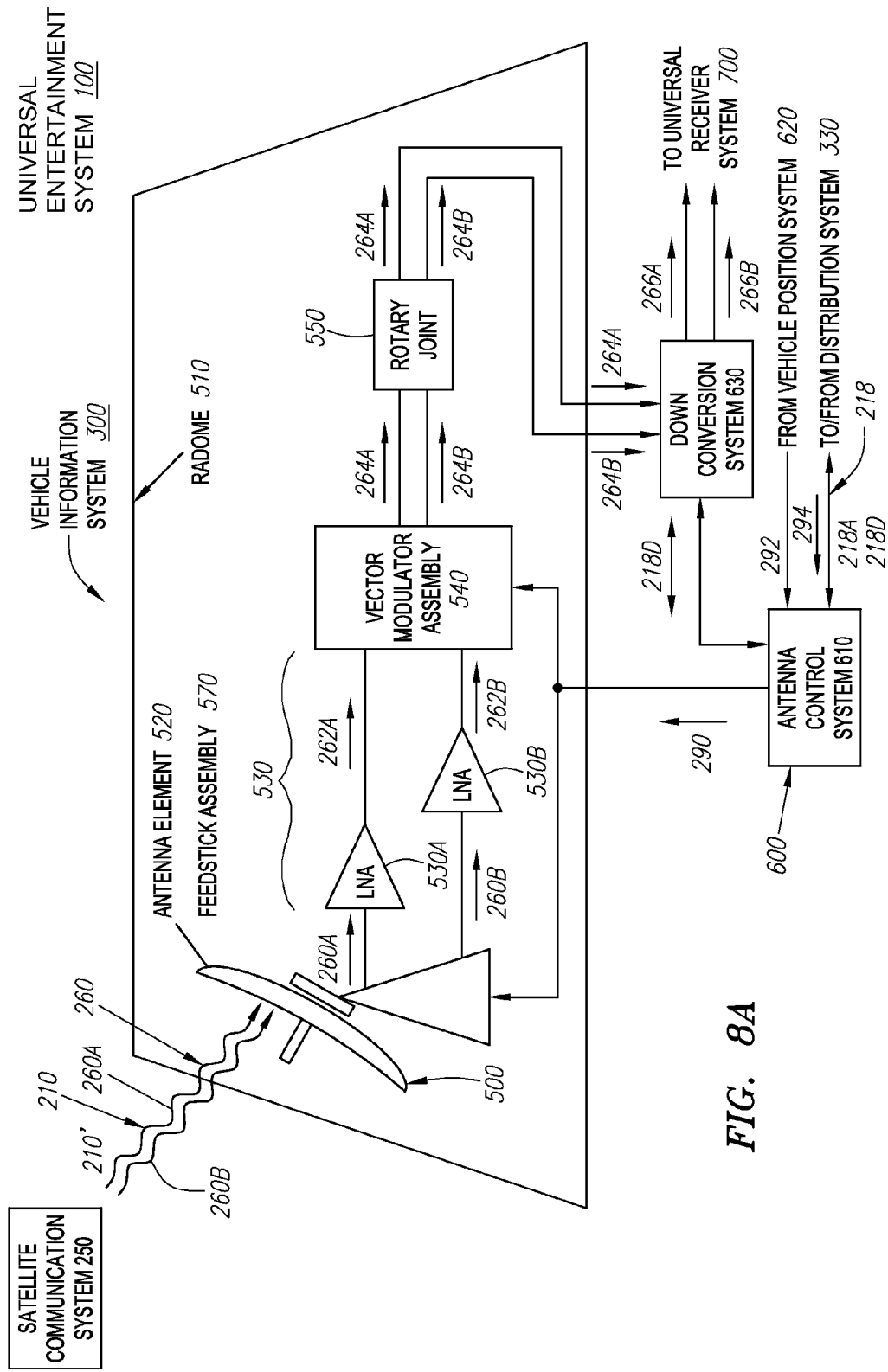
FIG. 8A is an exemplary block diagram illustrating representative primary functional components of an embodiment of the multi-regional antenna subsystem of the vehicle information system of FIG. 7.
Figure 8B:
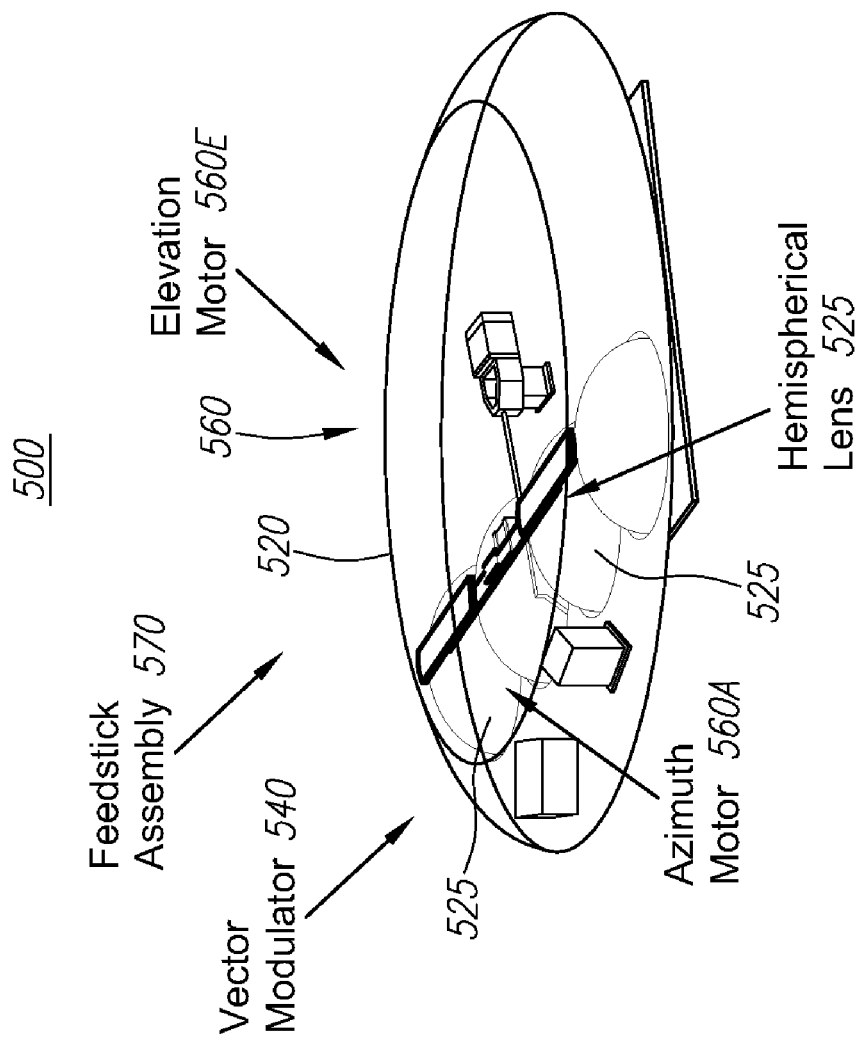
FIG. 8B is a detail drawing illustrating an alternative embodiment of the multi-regional antenna subsystem of FIG.
Figure 8C:
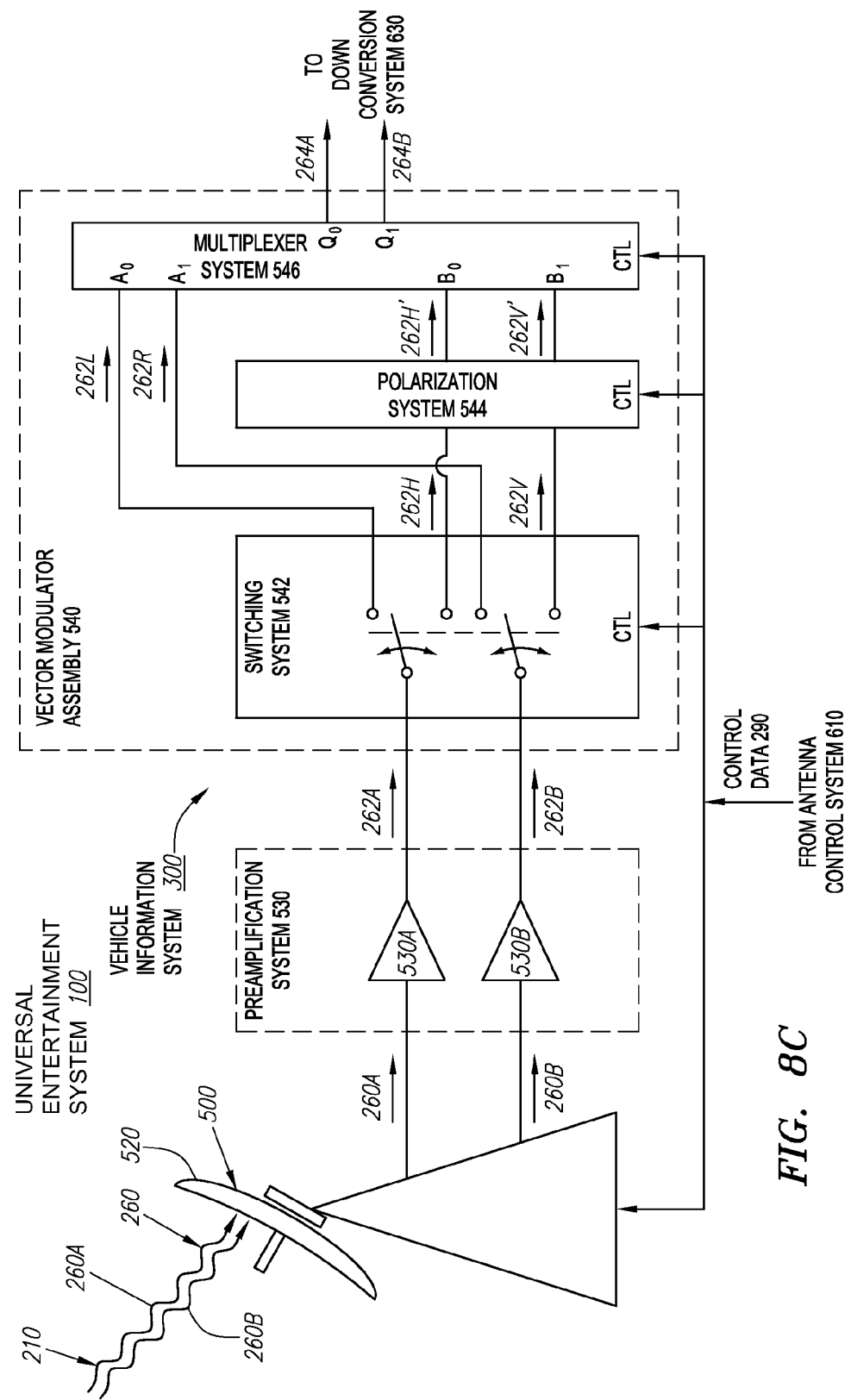

FIG. 8C is an exemplary block diagram illustrating another alternative embodiment of the multi-regional antenna subsystem of FIG. 8A, wherein the multi-regional antenna subsystem is configurable to receive oppositely-polarized direct broadcast satellite (DBS) signals.

FIGS. 9A-C illustrate a method for calibrating the multi-regional antenna subsystem and the universal receiver system for receiving the viewing content from a preselected satellite communication system.

Figure 7:
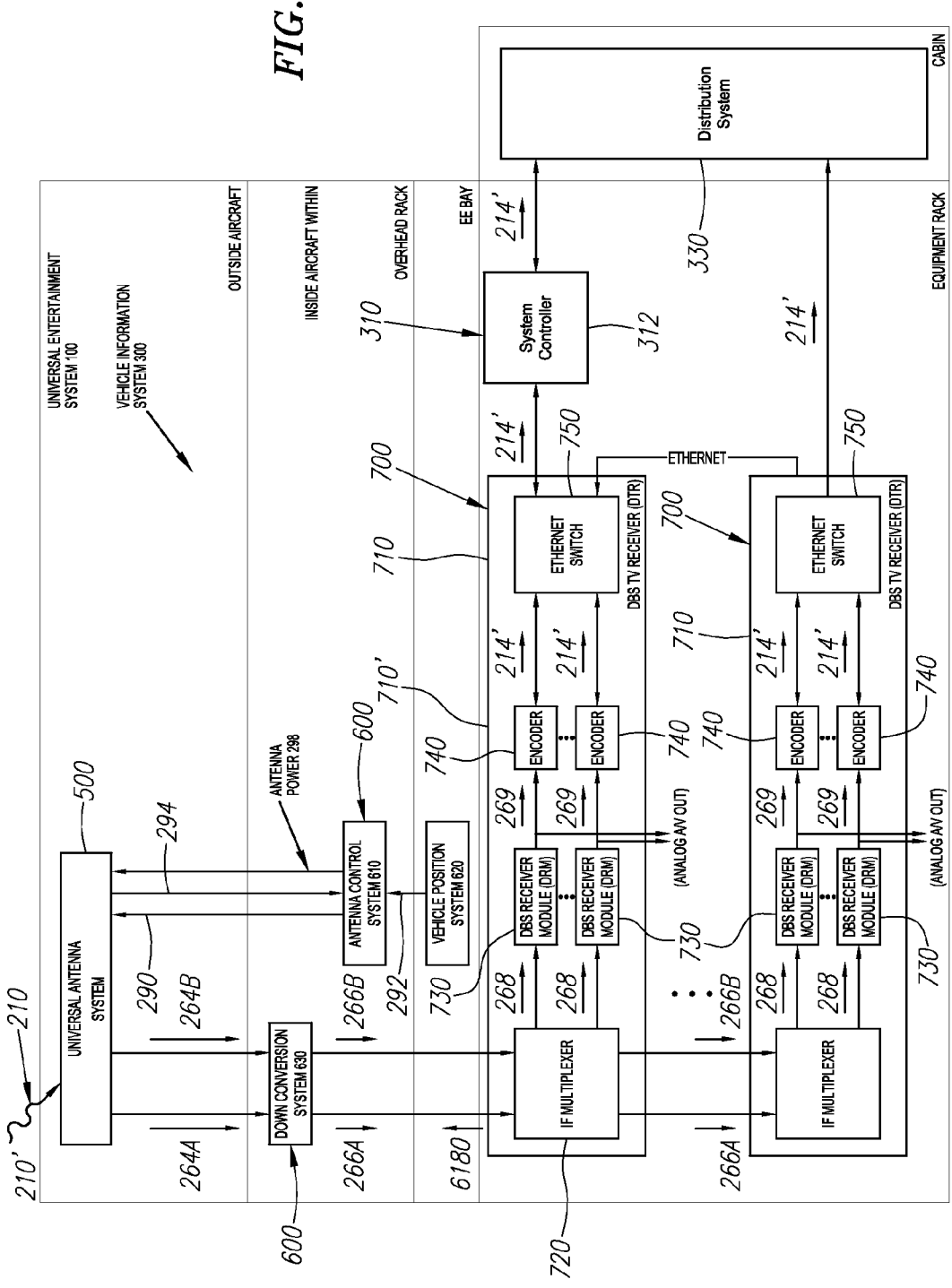
FIG. 7 is a detail drawing illustrating an alternative embodiment of the vehicle information system of FIG. 5, wherein the universal receiver system comprises a plurality of receiver modules for selecting the viewing content to be available for distribution throughout the vehicle information system.
Figure 10A:
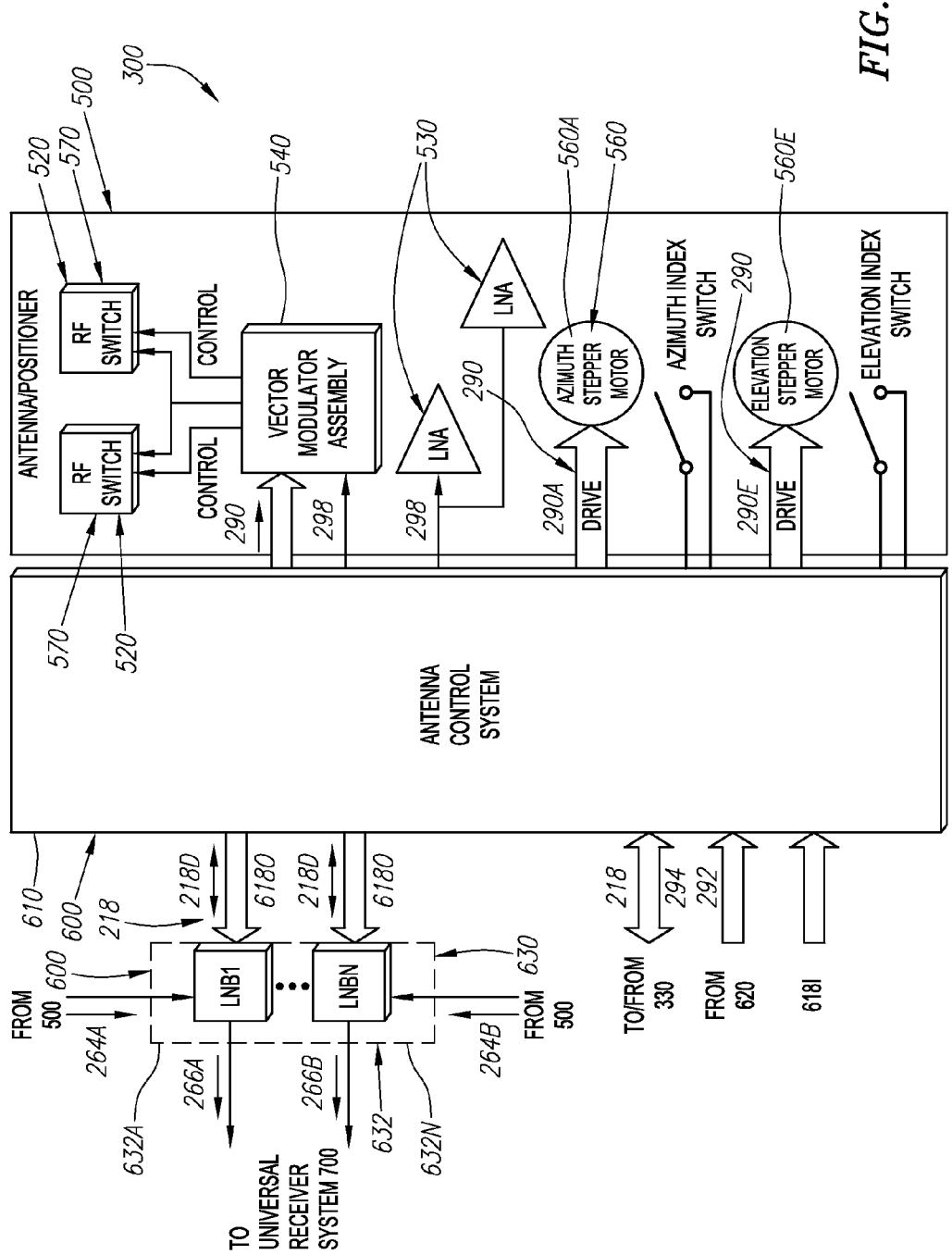

FIG. 10A is an exemplary block diagram illustrating an embodiment of an antenna control subsystem for the multi-regional antenna subsystem of FIG. 7.

Figure 10B:
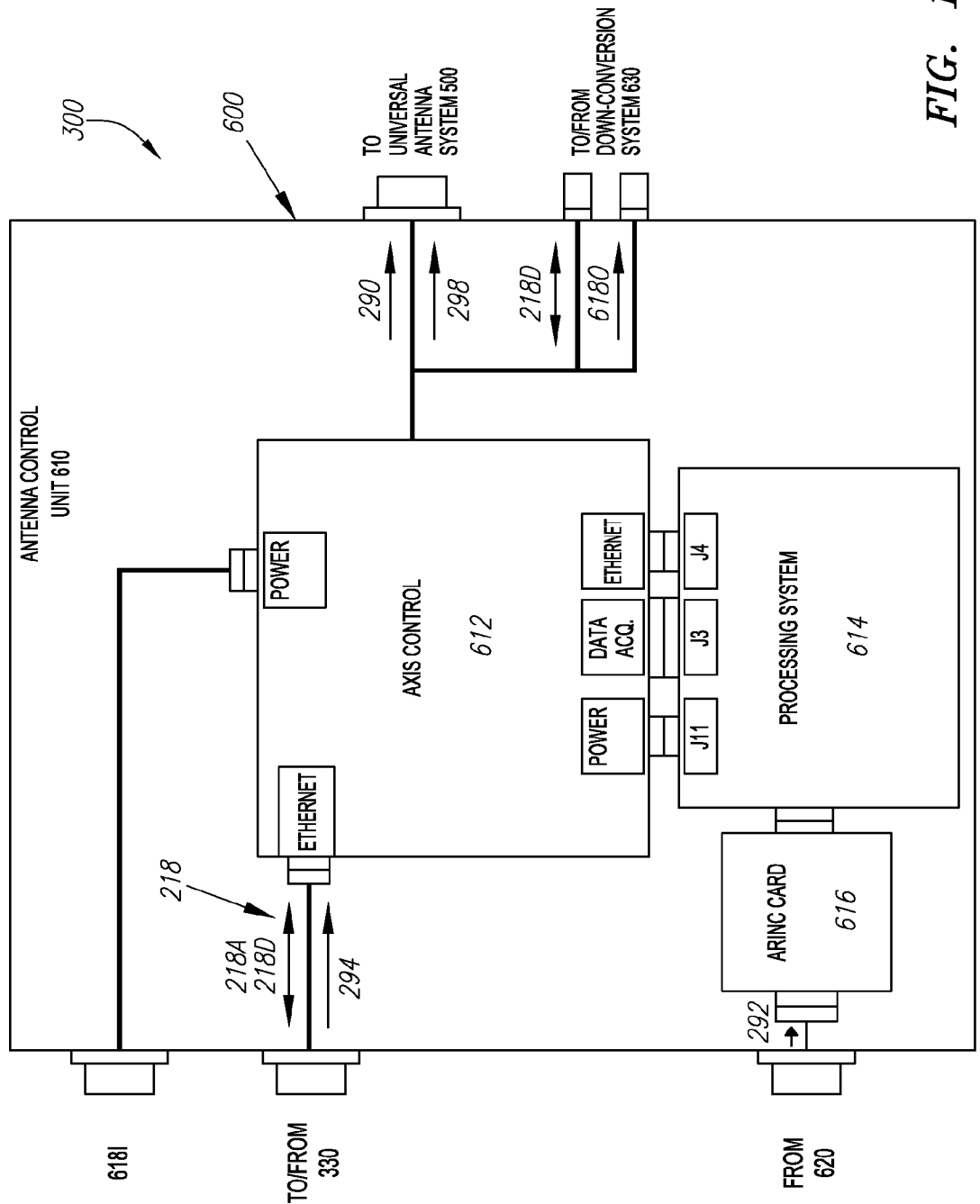

FIG. 10B is a detail drawing illustrating an alternative embodiment of the antenna control subsystem of FIG. 10A, wherein the antenna control subsystem includes an axis control system.

Figure 11A:
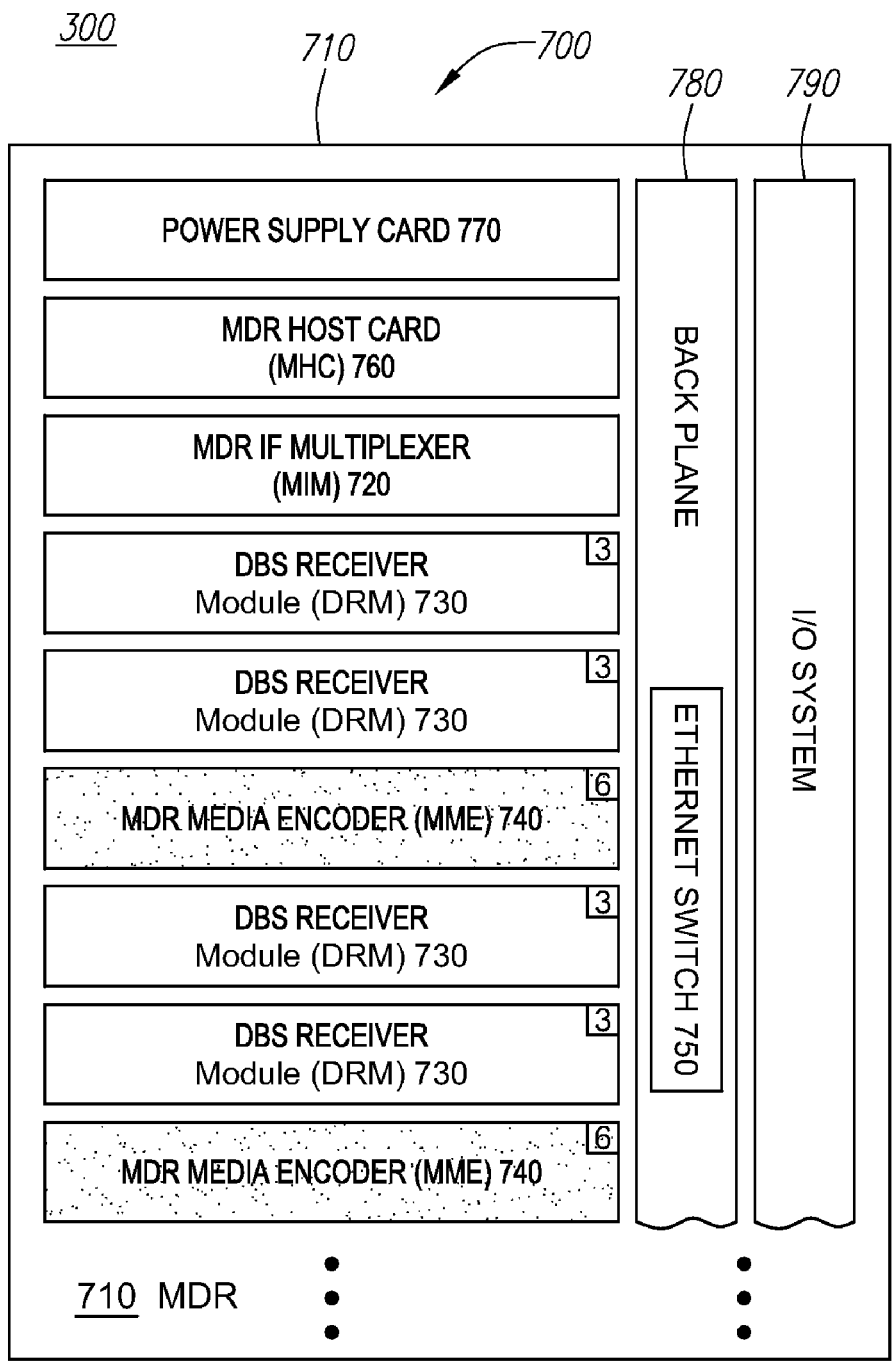

FIG. 11A is an exemplary block diagram illustrating representative primary functional components of an embodiment of the universal receiver system of the vehicle information system of FIG. 7.

Figure 11B:
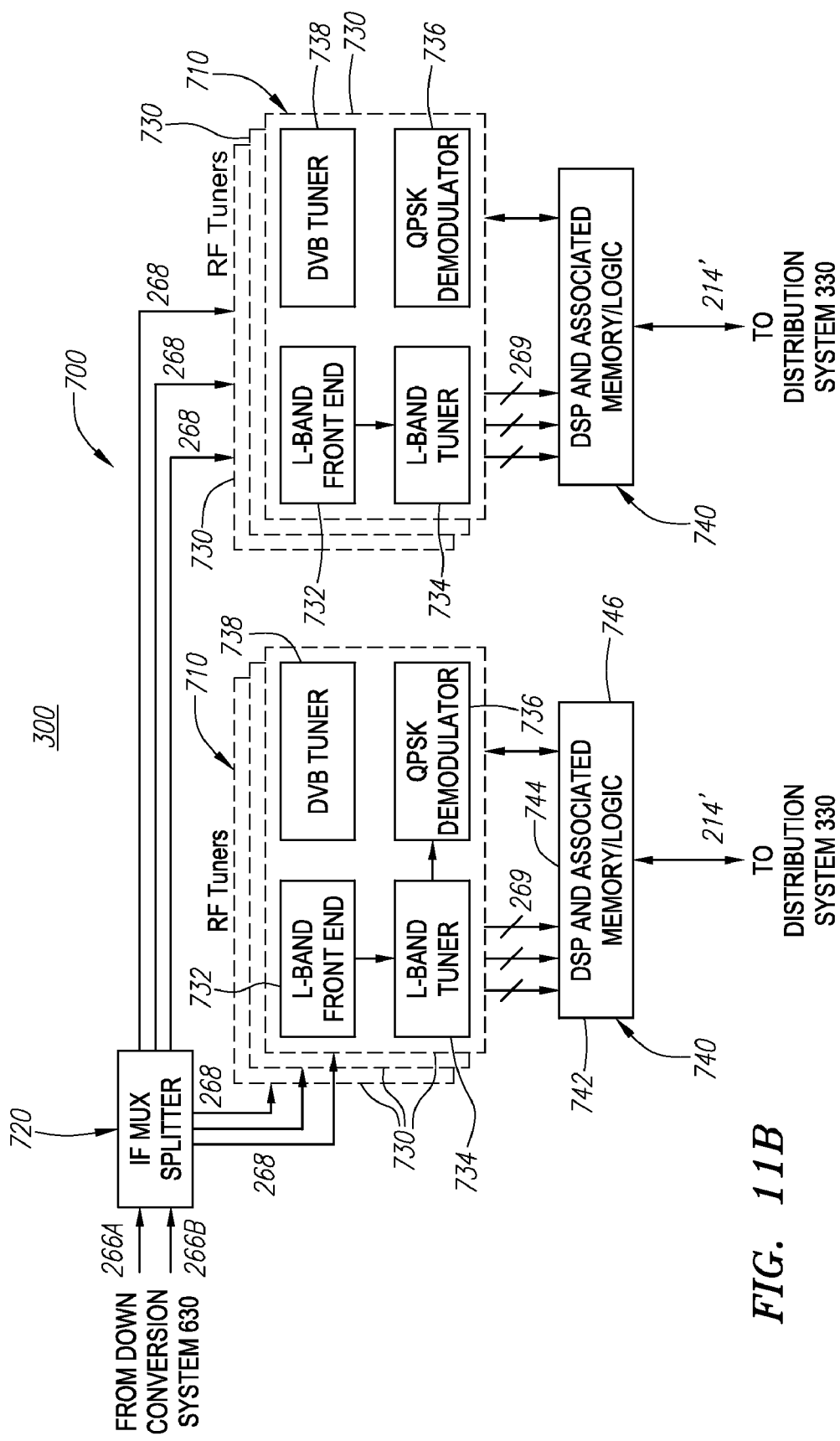

FIG. 11B is a detail drawing illustrating an alternative embodiment of the universal receiver system of FIG. 11A, wherein the universal receiver system includes a plurality of tuner systems for selecting the received viewing content for distribution within, and presentation by, the vehicle information system.

Figure 12:
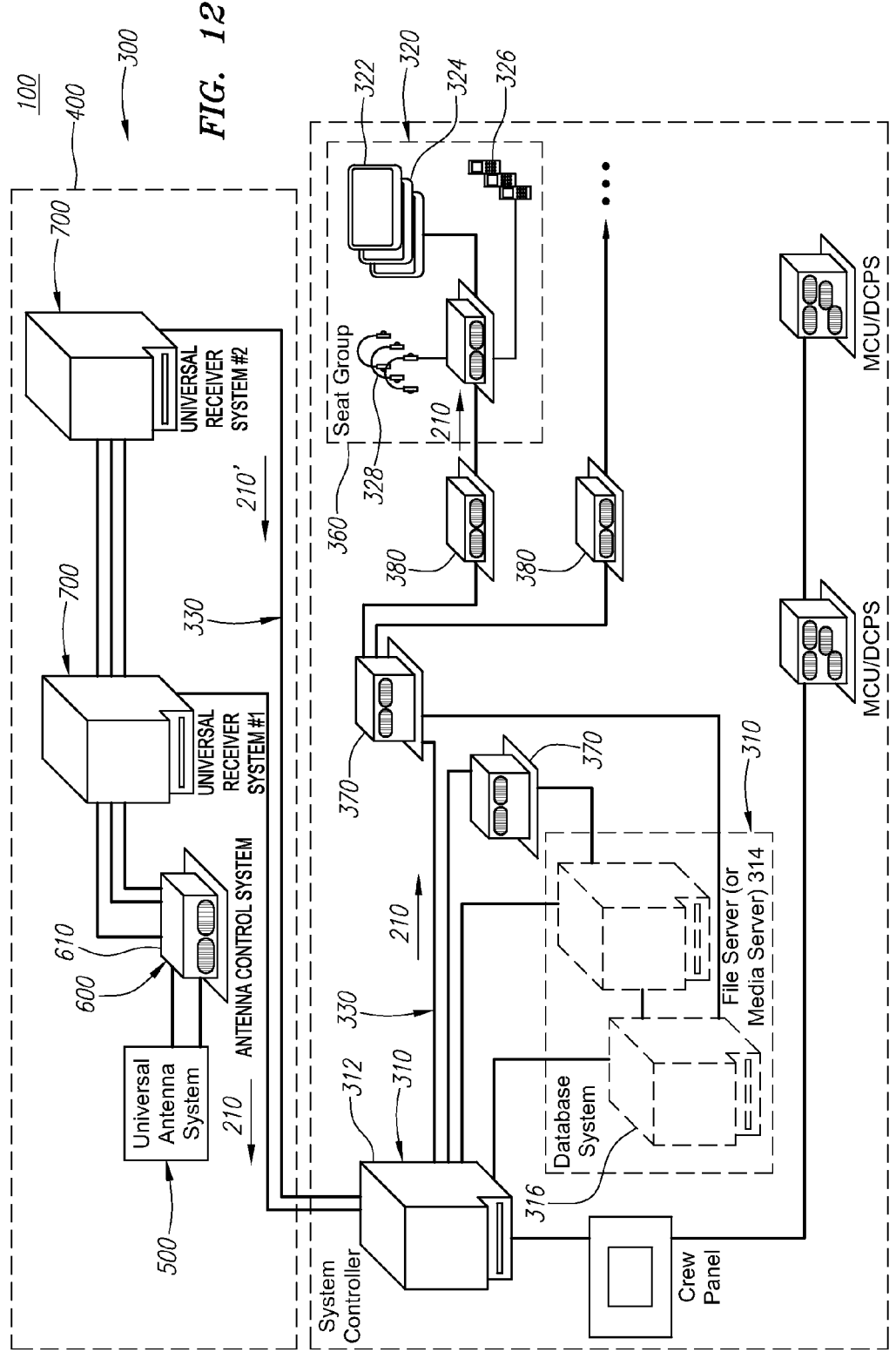

FIG. 12 is an exemplary block diagram illustrating an embodiment of the vehicle information system of FIG. 7, wherein the vehicle information system is configured for distributing the viewing content to passenger seats within the aircraft.

Figure 5:
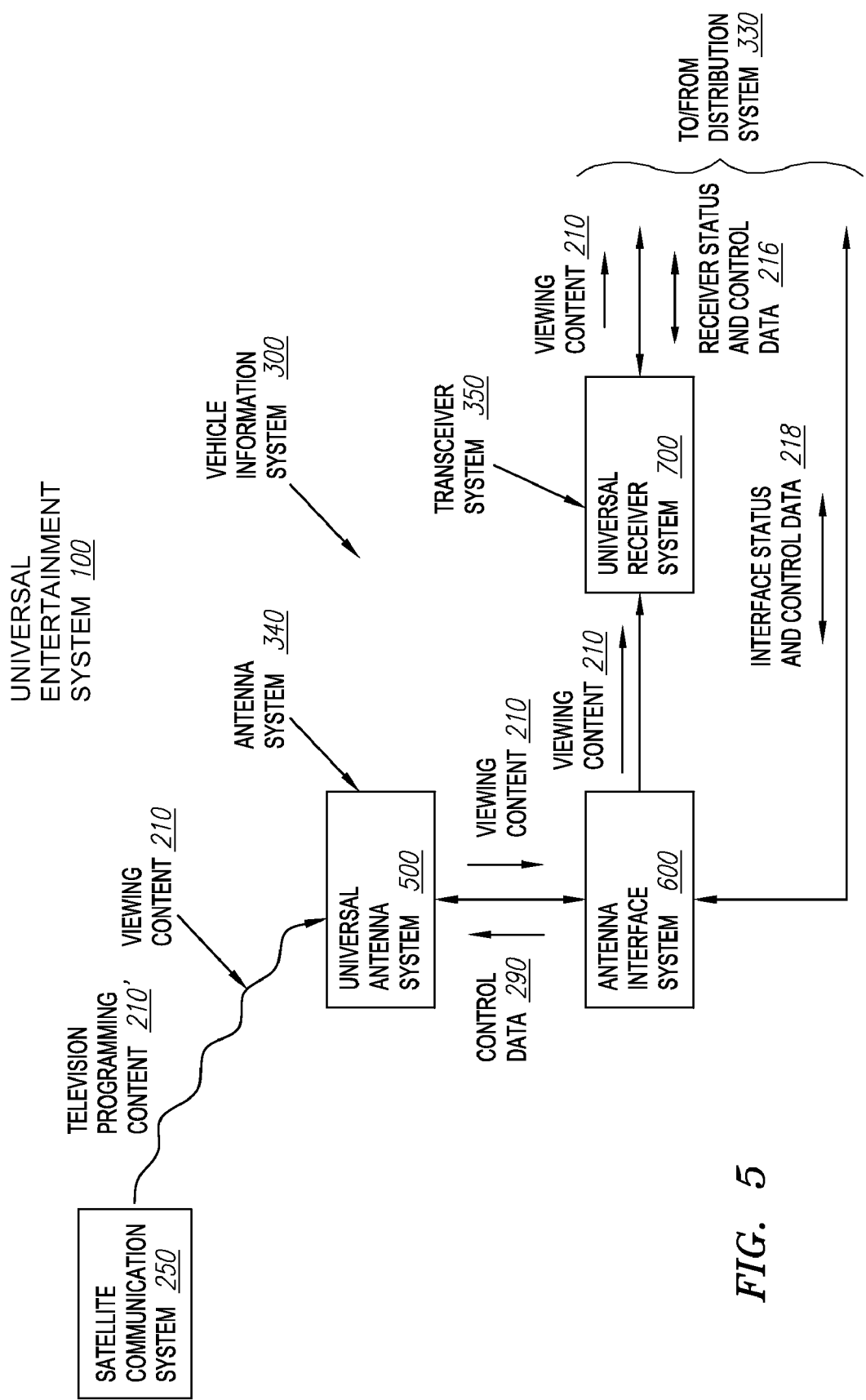
FIG. 5 is an exemplary top-level block diagram illustrating still another alternative embodiment of the universal entertainment system of FIG. 1, wherein the vehicle information system includes a multi-regional antenna subsystem and a universal receiver system for receiving the viewing content from the content source via a satellite communication system.
Figure 13A:
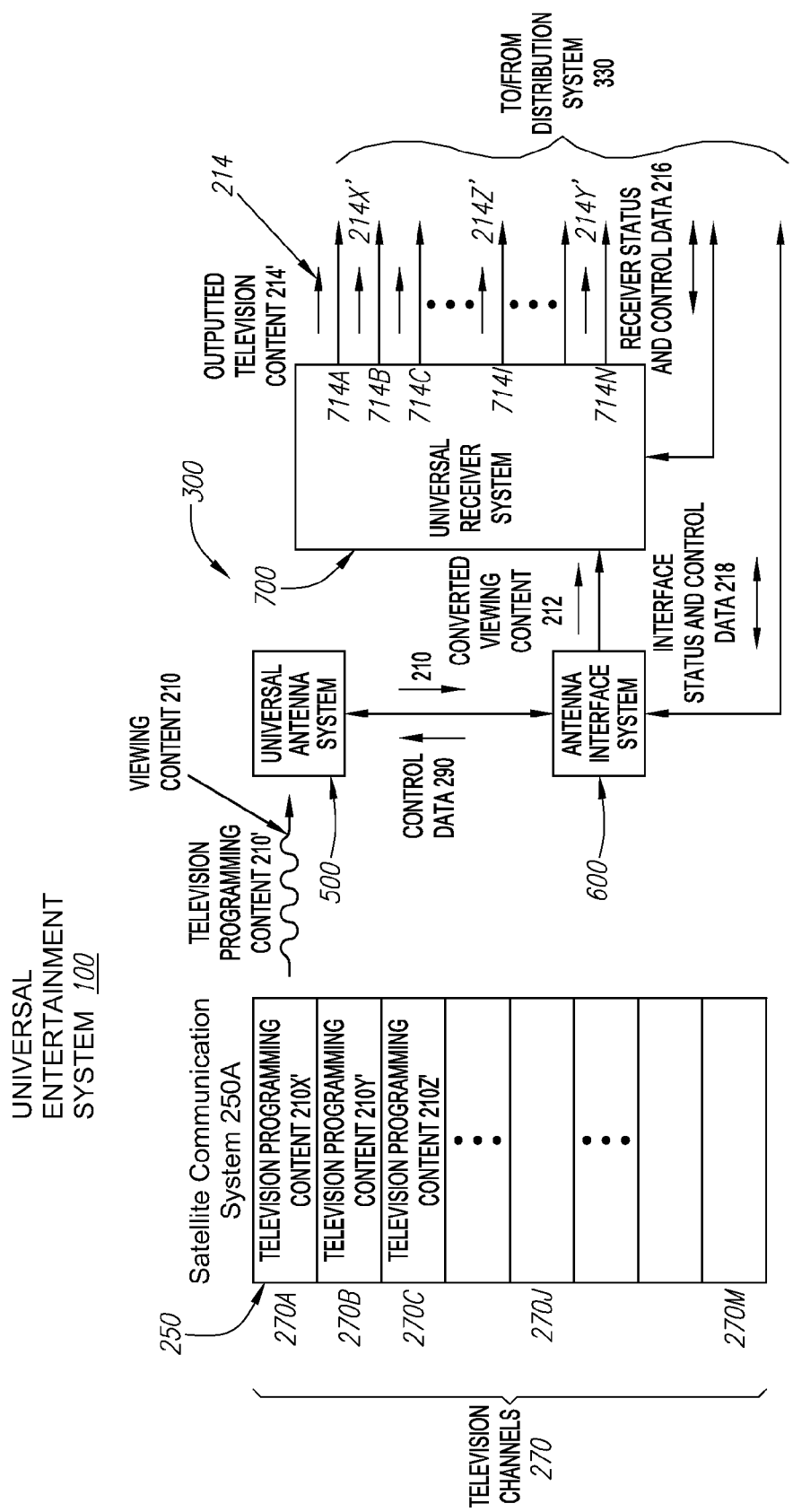

FIG. 13A is an exemplary block diagram illustrating another alternative embodiment of the vehicle information system of FIG. 5, wherein viewing content from selected content providers on selected channels of the vehicle information system.

Figure 13B:
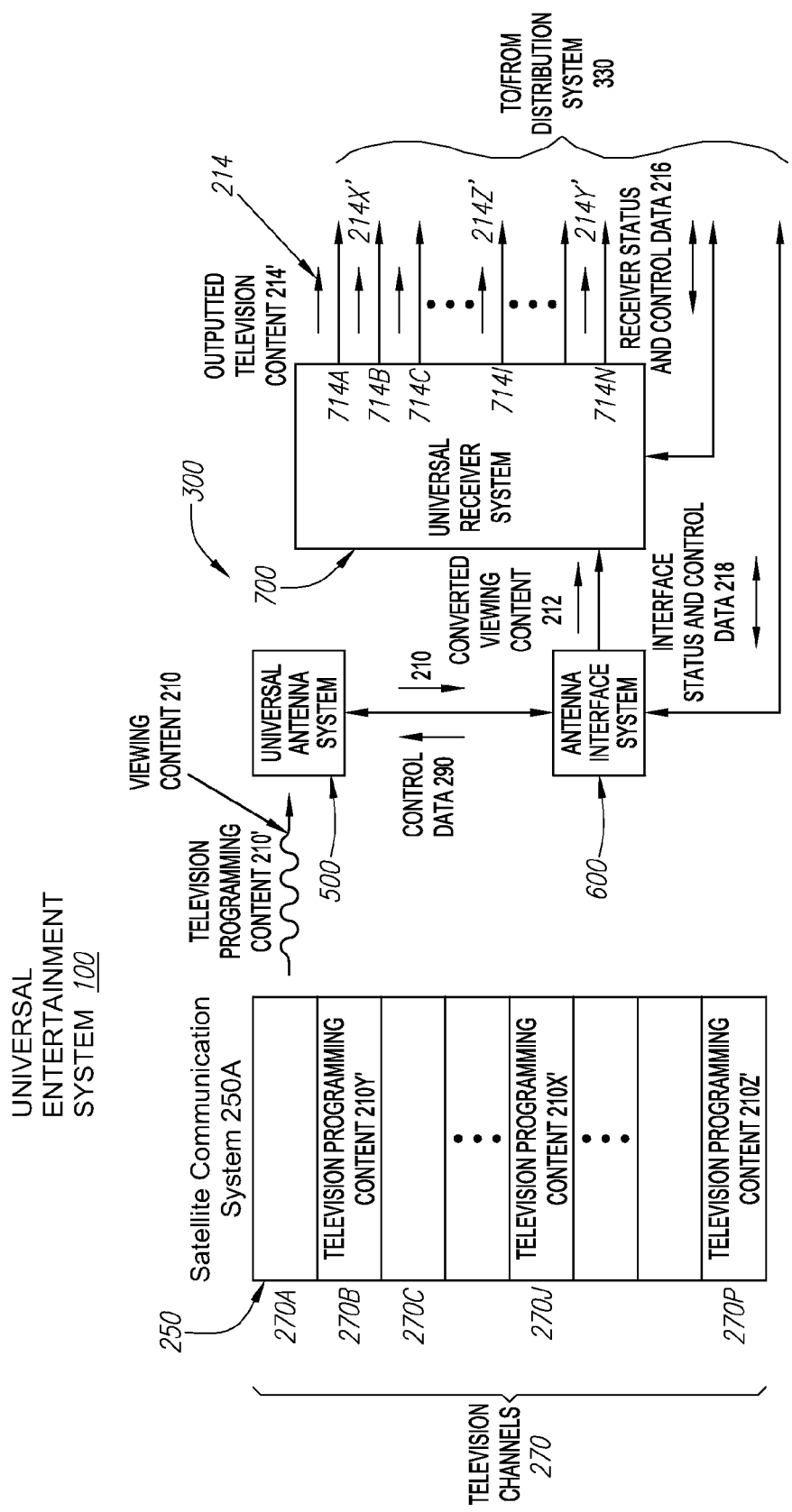

FIG. 13B is an exemplary block diagram illustrating an alternative embodiment of the vehicle information system of FIG. 13A, wherein the viewing content from the selected content providers continues to be provided on the selected channels as the vehicle information system travels between coverage regions of satellite communication systems.

Figure 14:
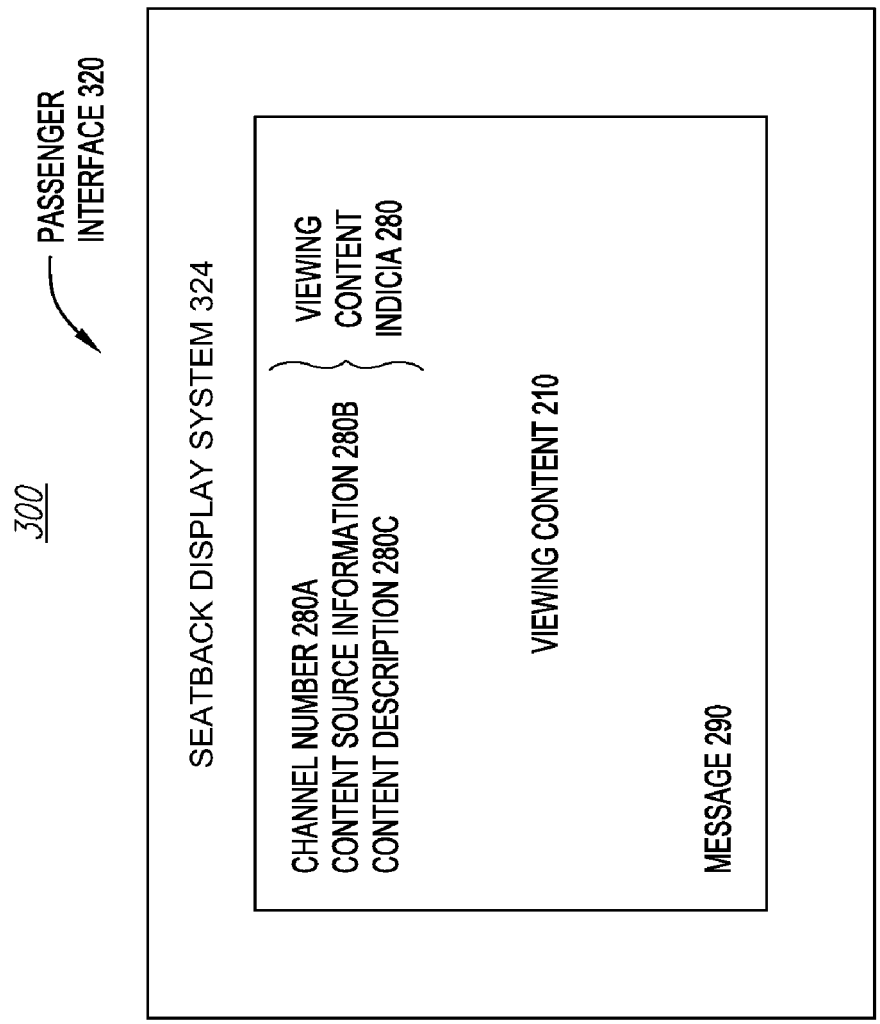

FIG. 14 is a detail drawing illustrating another alternative embodiment of the vehicle information system of FIG. 5, wherein the vehicle information system can present viewing content indicia associated with the viewing content via the passenger interfaces.

Figure 15:
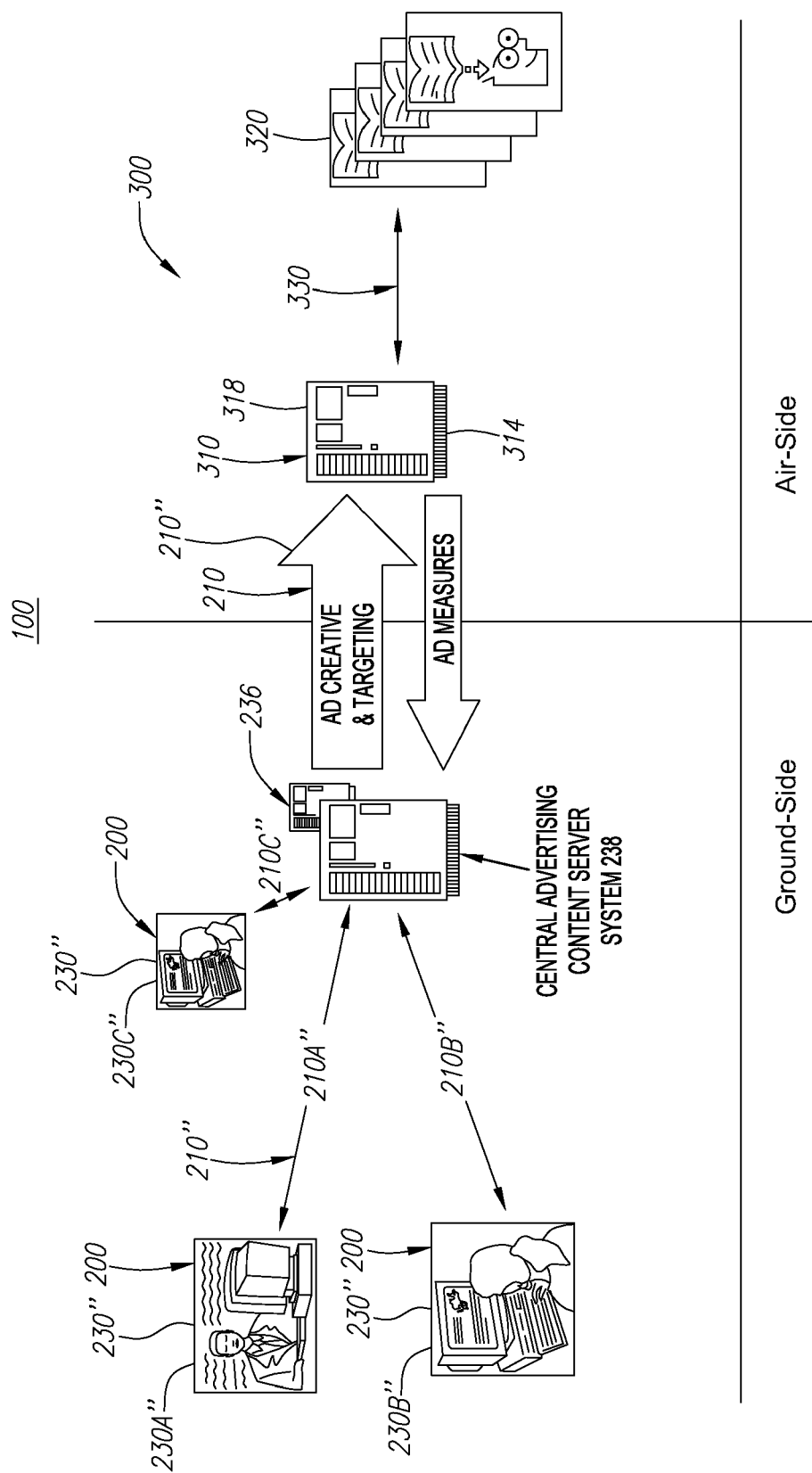

FIG. 15 is an exemplary block diagram illustrating another alternative embodiment of the universal entertainment system of FIG. 5, wherein at least one content source includes an advertising content source for providing advertising content to the vehicle information system.

It should be noted that the figures are not drawn to scale and that elements of similar structures or functions are generally represented by like reference numerals for illustrative purposes throughout the figures. It also should be noted that the figures are only intended to facilitate the description of the preferred embodiments of the present disclosure. The figures do not describe every aspect of the present disclosure and do not limit the scope of the disclosure.

DETAILED DESCRIPTION OF THE PREFERRED EMBODIMENTS

Since currently-available entertainment systems require periodic adjustment during travel through diverse geographical regions, a universal entertainment system for providing reception of viewing content with limited interruption in service during international travel can prove desirable and provide a basis for a wide range of entertainment system applications, such as passenger entertainment systems for use on aircraft and other types of vehicles. This result can be achieved, according to one embodiment disclosed herein, by employing a universal entertainment system 100 as shown in FIG. 1.

Figure 1:
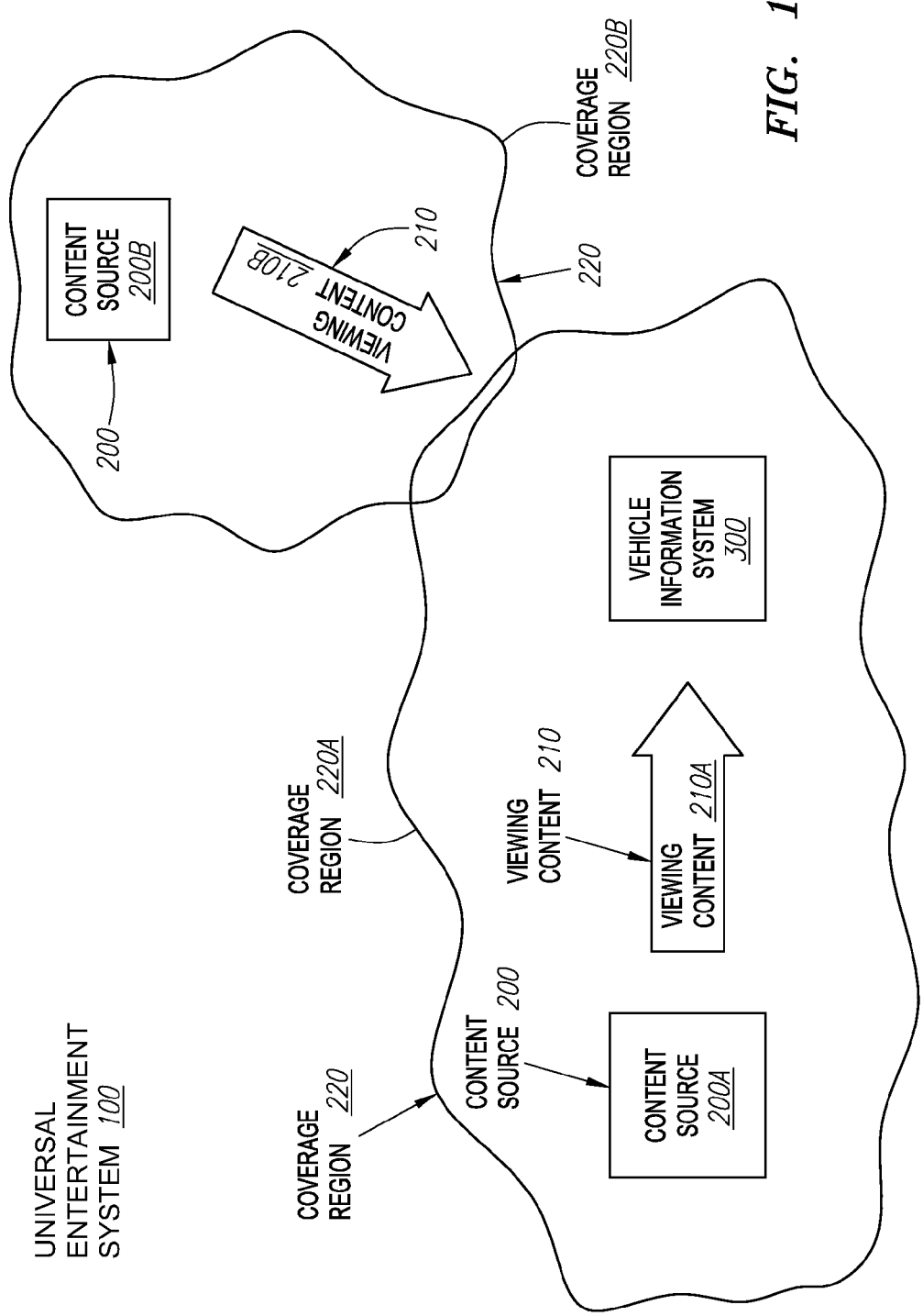
FIG. 1 is an exemplary top-level block diagram illustrating an embodiment of a universal entertainment system wherein the universal entertainment system includes a vehicle information system for receiving and selectably presenting viewing content provided by one or more content sources.

The universal entertainment system 100 illustrated in FIG. 1 includes one or more content sources 200 and at least one vehicle information system 300. Each content source 200 provides viewing content 210 and has a predetermined coverage region 220. When the vehicle information system 300 is within the coverage region 220 of a selected content source 200, the vehicle information system 300 can receive the viewing content 210 provided by the selected content source 200. The vehicle information system 300 can pass through the coverage regions 220 of more than one of the content sources 200 during travel, particularly during international travel. For example, the vehicle information system 300 is shown as being within the coverage region 220A of the content source 200A and as receiving viewing content 210A. The vehicle information system 300 can subsequently leave the coverage region 220A of the content source 200A and/or enter the coverage region 220B of the content source 200B. If leaving the coverage region 220A and entering the coverage region 220B, the vehicle information system 300 advantageously can automatically switch from receiving the viewing content 210A to receiving the viewing content 210B with limited interruption in service.

Each content source 200 can be provided in any conventional manner, such as via one or more hardware components and/or software components, and can be disposed proximately to, and/or remotely from, the vehicle information system 300. For example, the content source 200 can be provided in the manner set forth in the co-pending U.S. patent applications, entitled "SYSTEM AND METHOD FOR DOWNLOADING FILES," Ser. No. 10/772,565, filed on Feb. 4, 2004; entitled "SYSTEM AND METHOD FOR MANAGING CONTENT ON MOBILE PLATFORMS," Ser. No. 11/123,327, filed on May 6, 2005; and entitled "PORTABLE MEDIA DEVICE AND METHOD FOR PRESENTING VIEWING CONTENT DURING TRAVEL," Ser. No. 11/154,749, filed on Jun. 15, 2005, which are assigned to the assignee of the present application and the respective disclosures of which are hereby incorporated herein by reference in their entireties.

The viewing content 210 can comprise any suitable type of viewing content 210, such as stored (or time-delayed) viewing content and/or live (or real-time) viewing content, in the manner set forth in the above-referenced co-pending U.S. patent applications, entitled "SYSTEM AND METHOD FOR DOWNLOADING FILES," Ser. No. 10/772,565, filed on Feb. 4, 2004, and entitled "PORTABLE MEDIA DEVICE AND METHOD FOR PRESENTING VIEWING CONTENT DURING TRAVEL," Ser. No. 11/154,749, filed on Jun. 15, 2005. As desired, the viewing content 210 can include geographical information in the manner set forth in U.S. Pat. No. 6,661,353, entitled "METHOD FOR DISPLAYING INTERACTIVE FLIGHT MAP INFORMATION," which is assigned to the assignee of the present application and the disclosure of which is hereby incorporated herein by reference in its entirety. In addition to entertainment content, such as live satellite television programming and/or live satellite radio programming, the viewing content 210 preferably can include two-way communications such as real-time Internet access and/or telecommunications in the manner set forth in U.S. Pat. No. 5,568,484, entitled "TELECOMMUNICATIONS SYSTEM AND METHOD FOR USE ON COMMERCIAL AIRCRAFT AND OTHER VEHICLES," which is assigned to the assignee of the present application and the disclosure of which is hereby incorporated herein by reference in its entirety.

Being configured to receive the viewing content 210 from the content sources 200, the vehicle information system 300 can communicate with the content sources 200 in any conventional manner, preferably via wireless communications. Turning to FIGS. 2A-B, the vehicle information system 300 is illustrated as being associated with a vehicle 400 and can comprise any suitable type of mobile conventional entertainment system, such as a passenger entertainment system, in the manner set forth in the above-referenced co-pending U.S. patent applications, entitled "SYSTEM AND METHOD FOR DOWNLOADING FILES," Ser. No. 10/772,565, filed on Feb. 4, 2004, and entitled "PORTABLE MEDIA DEVICE AND METHOD FOR PRESENTING VIEWING CONTENT DURING TRAVEL," Ser. No. 11/154,749, filed on Jun. 15, 2005, as well as the co-pending U.S. patent application, entitled "SYSTEM AND METHOD FOR PRESENTING HIGH-QUALITY VIDEO TO PASSENGERS ON A MOBILE PLATFORM," Ser. No. 60/673,171, filed on Apr. 19, 2005, the disclosure of which is hereby incorporated herein by reference in its entirety.

The vehicle information system 300 preferably is configured to be installed on a wide variety of vehicles 500. Exemplary types of vehicles can include an automobile 410 (shown in FIG. 2A), an aircraft 420 (shown in FIG. 2B), a bus, a recreational vehicle, a boat, and/or a locomotive, without limitation. If installed on an aircraft 420 as illustrated in FIG. 2B, for example, the vehicle information system 300 can comprise a conventional aircraft passenger in-flight entertainment system, such as the Series 2000, 3000, eFX, and/or eX2 in-flight entertainment system as manufactured by Panasonic Avionics Corporation (formerly known as Matsushita Avionics Systems Corporation) of Lake Forest, Calif.

As shown in FIGS. 2A-B, the vehicle information system 300 includes an antenna system 340 and a transceiver system 350 for receiving the viewing content 210 from the content sources 200. The antenna system 340 preferably is disposed outside the vehicle 400, such as an exterior surface 440 of a fuselage 430 of the aircraft 420. The vehicle information system 300 likewise can include at least one conventional server system 310. Configurable in any suitable manner, including as a central server system and/or a distributed server system, the server system 310 can include an processor-based subsystem 312 (shown in FIG. 7) for providing overall system control functions for the vehicle information systems 300 and/or at least one media (or file) server system 314 (shown in FIG. 12) for storing preprogrammed content and/or the received viewing content 210, as desired. The server system 310 can include, and/or communicate with, one or more conventional peripheral media storage systems (not shown), including optical media devices, such as a digital video disk (DVD) system and/or a compact disk (CD) system, and or magnetic media systems, such as a video cassette recorder (VCR) system and/or a hard disk drive (HDD) system, of any suitable kind, for storing preprogrammed content and/or the received viewing content 210.

One or more passenger interfaces 320 are provided for selecting preprogrammed content and/or the received viewing content 210 and for presenting the selected preprogrammed content and/or viewing content 210. As desired, the passenger interfaces 320 can comprise conventional passenger interfaces and can be provided in the manner set forth in the above-referenced co-pending U.S. patent application, entitled "PORTABLE MEDIA DEVICE AND METHOD FOR PRESENTING VIEWING CONTENT DURING TRAVEL," Ser. No. 11/154,749, filed on Jun. 15, 2005. Each passenger interface 320 can include a video interface system and/or an audio interface system. Overhead cabin display systems 322 (shown in FIG. 12) with central controls, seatback display systems 324 (shown in FIG. 12) with individualized controls, crew display panels 323 (shown in FIG. 12), and/or handheld presentation systems 326 (shown in FIG. 12) are exemplary video interface systems; whereas, illustrative conventional audio interface systems can be provided via the handheld presentation systems 326 and/or headphones 328 (shown in FIG. 12). Passengers (not shown) who are traveling aboard the vehicle 400 thereby can enjoy the preprogrammed content and/or the received viewing content 210 during travel.

The antenna system 340 and the transceiver system 350 of the vehicle information system 300 is illustrated in FIGS. 2A-B as communicating with the server system 310 and the passenger interfaces 320 via a distribution system 330. The distribution system 330 can be provided in any conventional manner and is configured to support any conventional type of communications, including wired communications and/or wireless communications, as set forth in the above-referenced co-pending U.S. patent application, entitled "PORTABLE MEDIA DEVICE AND METHOD FOR PRESENTING VIEWING CONTENT DURING TRAVEL," Ser. No. 11/154,749, filed on Jun. 15, 2005. Preferably being distributed via high-speed data communications, the preprogrammed content and/or the received viewing content 210 can be distributed throughout the vehicle information system 300 in any suitable manner, including in the manner set forth in U.S. Pat. Nos. 5,596,647, 5,617,331, and 5,953,429, each entitled "INTEGRATED VIDEO AND AUDIO SIGNAL DISTRIBUTION SYSTEM AND METHOD FOR USE ON COMMERCIAL AIRCRAFT AND OTHER VEHICLES," the disclosures of which are hereby incorporated herein by reference in their entireties.

Turning to FIG. 3, the content source preferably provides viewing content 210 to the vehicle information system 300 via one or more satellite communication systems 250, such as a Ku-Band satellite communication system. For example, if the satellite communication system 250 comprises a direct broadcast satellite (DBS) television system, the viewing content 210 can include real-time (or live) television programming content 210' provided by one or more television sources 230 as illustrated in FIG. 3. Each television source 230 can comprise a regional television content provider, such as an established television network and/or a provider of specialized television programming, that provides at least one channel of television programming content 210' to residences 240 within a selected geographical region. In addition to providing the television programming content 210' to the residences 240 via one or more broadcast television systems 232 and/or cable television systems 234, the television source 230 likewise can provide the television programming content 210' to an uplink system 236 for distribution via at least one satellite communication system 250, each comprising one or more satellites (not shown).

Figure 4:
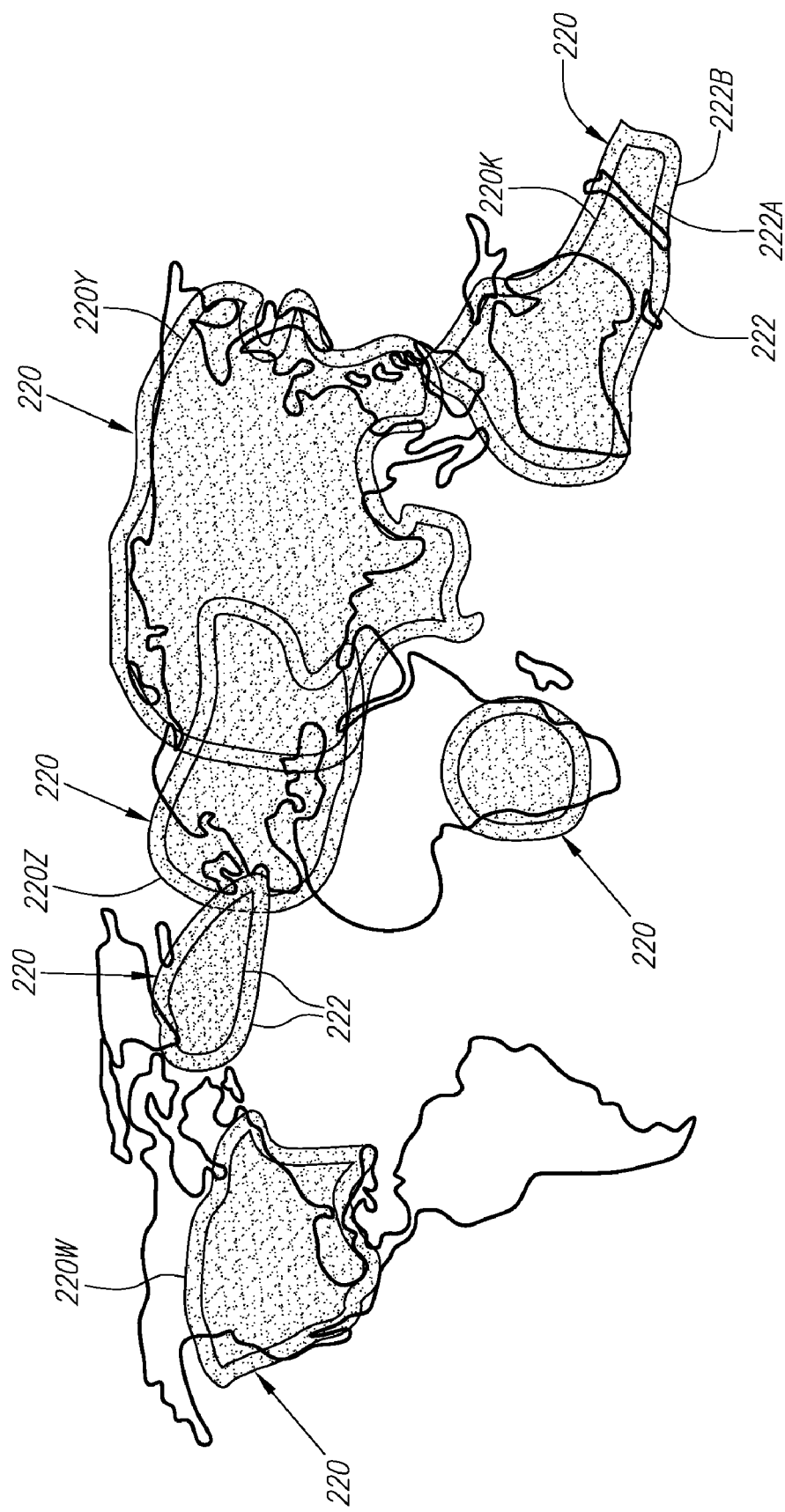
FIG. 4 is a detail drawing illustrating exemplary coverage regions for a plurality of satellite communication systems, wherein each coverage region has one or more contour boundary based upon signal strength.

By distributing the television programming content 210' via the satellite communication system 250, the television programming content 210' can be provided with digital quality video and audio. For example, the uplink system 236 can convert the television programming content 210' into a digital format, such as a Moving Picture Experts Group (MPEG-1, MPEG-2, MPEG-4) transport stream, and broadcast via Digital Video Broadcasting (DVB) satellite television programming. The television programming content 210' thereby can be provided throughout the broad coverage region 220 (shown in FIG. 1) of the satellite communication system 250. As shown in FIG. 4, exemplary coverage regions 220 can include Australia, Europe, Middle East, Africa, Asia, Japan, Latin America, South America, and/or North America, in whole and/or in part.

The exemplary coverage regions 220 illustrated in FIG. 4 can include one or more coverage regions 220 that are substantially separate (or do not overlap) and/or one or more coverage regions 220 that at least partially overlap. For example, the coverage regions 220W and 220X are shown in FIG. 4 as being substantially separate coverage regions 220; whereas, the coverage regions 220Y and 220Z are illustrated as being at least partially overlapping coverage regions 220. Each coverage region 200 likewise can have at least one contour boundary 222 based upon signal strength (or signal power level). It will be appreciated that the signal strength of the television programming content 210' (shown in FIG. 3) decreases as the distance from the relevant satellite communication system 250 (shown in FIG. 3) increases. The coverage region 220X, for instance, is shown as having two illustrative contour boundaries 222A, 222B, wherein the minimum power level of the television programming content 210' within the smaller contour boundary 222A is greater than the minimum power level of the television programming content 210' within the larger contour boundary 222B.

Returning to FIG. 3, the vehicle information system 300 can be configured to receive, and selectably present, the viewing content 210 provided via the satellite communication systems 250. As shown in FIG. 3, the viewing content 210 available to the vehicle information system 300 can include the television programming content 210'. The vehicle information system 300 thereby can advantageously utilize existing satellite communication systems 250 that currently are used to provide the television programming content 210' to the residences 240. Therefore, passengers can enjoy digital-quality television programming content 210' during travel, including international travel, that is based upon the same television programming content 210' that is available in their homes.

As desired, the television programming content 210' can include "free-to-air" (or unencrypted) content and/or premium (or encrypted) content. "Free-to-air" content is television programming content 210' that is not encrypted and that is broadcast free of charge to viewers within selected geographical regions, such as Europe and Middle East; whereas, premium content is encrypted content that is available for viewing upon payment of a fee to the television source 230. In the manner set forth in the above-referenced co-pending U.S. patent applications, entitled "SYSTEM AND METHOD FOR DOWNLOADING FILES," Ser. No. 10/772,565, filed on Feb. 4, 2004, and entitled "PORTABLE MEDIA DEVICE AND METHOD FOR PRESENTING VIEWING CONTENT DURING TRAVEL," Ser. No. 11/154,749, filed on Jun. 15, 2005, the passenger interfaces 320 (shown in FIGS. 2A-B) can be separated into a plurality of interface groups. Illustrative interface groups can include types of passenger seat groups 360 (shown in FIG. 12) and/or types of passenger groups aboard the vehicle 400 (shown in FIGS. 2A-B).

If the passenger interfaces 320 are associated with types of passengers traveling on board the vehicle 400, such as vehicle crew, premium-class (or first-class) passengers, business-class passengers, and/or economy-class (or coach-class) passengers, the functionality of the passenger interfaces 320 within each interface group can be the same as, and/or differ from, the functionality of the passenger interfaces 320 within the other interface groups. As desired, the functionality of a selected passenger interface 320 can include the variety of viewing content 210 made available by the vehicle information system 300 to the selected passenger interface 320 for selection and presentation. For example, the passenger interfaces 320 associated with first-class passengers may permitted to select and view the "free-to-air" (or unencrypted) content and the premium (or encrypted) content; whereas, the passenger interfaces 320 associated with the coach-class passengers can be limited to selections from the "free-to-air" content. Coach-class passengers can be permitted to access and view other "free-to-air" content and/or the premium content for a fee.

An illustrative embodiment of the vehicle information system 300 is shown in FIG. 5 wherein the antenna system 340 and the transceiver system 350 respectfully comprise a universal (or multi-regional) antenna system 500 and a universal receiver system 700. Preferably being disposed under, and protected by, a radome 510 (shown in FIG. 8A), the multi-regional antenna subsystem 500 can be configured to receive the viewing content 210 in the manner set forth above and communicates with the universal receiver system 700 via an antenna interface system 600. Operating under the control of the server system 310 (shown in FIGS. 2A-B), the antenna interface system 600 can exchange interface status and control data 218 with the processor-based subsystem 312 (shown in FIG. 7) via the distribution system 330. The processor-based subsystem 312 thereby can provide instruction for controlling the operation of the multi-regional antenna subsystem 500 via the interface status and control data 218, and the antenna interface system 600, upon receiving the interface status and control data 218, can execute the instruction to control the multi-regional antenna subsystem 500 in accordance with the instruction provided by the processor-based subsystem 312.

For example, as the vehicle 400 (shown in FIGS. 2A-B) and, therefore, the vehicle information system 300 approach and/or enter the coverage region 220 (shown in FIG. 1) of a relevant satellite communication system 250, the processor-based subsystem 312 can provide interface status and control data 218 for reconfiguring the multi-regional antenna subsystem 500 to communicate with the satellite communication system 250. Upon receiving the interface status and control data 218, the antenna interface system 600 can reconfigure the multi-regional antenna subsystem 500. The multi-regional antenna subsystem 500 thereby can automatically begin to receive the viewing content 210, such as the television programming content 210', from the satellite communication system 250 as the vehicle enters the associated coverage region 220. As desired, the multi-regional antenna subsystem 500 can maintain communication with the satellite communication system 250, and continues to receive the viewing content 210, while the vehicle 400 remains within the associated coverage region 220.

The antenna control data 290 likewise can include steering data for controlling the physical positioning of the multi-regional antenna subsystem 500. The antenna interface system 600 thereby can continuously direct the multi-regional antenna subsystem 500 toward the satellite communication system 250 as the vehicle 400 passes through the associated coverage region 220. Further, the configuration of the multi-regional antenna subsystem 500 can be updated, as desired, during travel. The antenna interface system 600, for instance, can reconfigure the multi-regional antenna subsystem 500 for communicating with another satellite communication system

250 as the vehicle information system 300 subsequently approaches and/or enters the coverage region 220 of the other another satellite communication system 250. The multi-regional antenna subsystem 500 thereby can continuously receive the viewing content 210 during travel and provide the received viewing content 210 to the antenna interface system 600. As desired, antenna power 298 (shown in FIGS. 10A-B) can be provided to the multi-regional antenna subsystem 500 through the antenna interface system 600.

Upon receiving the received viewing content 210, the antenna interface system 600 can provide the received viewing content 210 to the universal receiver system 700. As desired, the antenna interface system 600 can preprocess the received viewing content 210 in any conventional manner and provide the preprocessed viewing content 210 to the universal receiver system 700. Illustrative preprocessing operations can include amplification and/or down-conversion of the received viewing content 210 without limitation. The antenna interface system 600 thereby can convert the received viewing content 210 into the preprocessed viewing content 210 that is suitable for distribution throughout the vehicle information system 300 without significant signal degradation.

The universal receiver system 700 can receive the viewing content 210, including the received viewing content and/or the preprocessed viewing content 210, from the antenna interface system 600 and provide the viewing content 210 to the distribution system 330 for distribution throughout within the vehicle information system 300. In the manner set forth above with reference to the antenna interface system 600, the universal receiver system 700 preferably operates under the control of the server system 310, exchanging receiver status and control data 216 with the processor-based subsystem 312 via the distribution system 330. The processor-based subsystem 312 thereby can configure the universal receiver system 700 to process the viewing content 210, as desired. For example, the universal receiver system 700 can select appropriate portions of the viewing content 210 for distribution throughout the vehicle information system 300 and presentation via the passenger interfaces 320 (shown in FIGS. 2A-B). The vehicle information system 300 thereby can advantageously receive and selectably present the viewing content 210 continuously during travel through one or more coverage regions 220 with limited interruption in service.

Figure 6A:
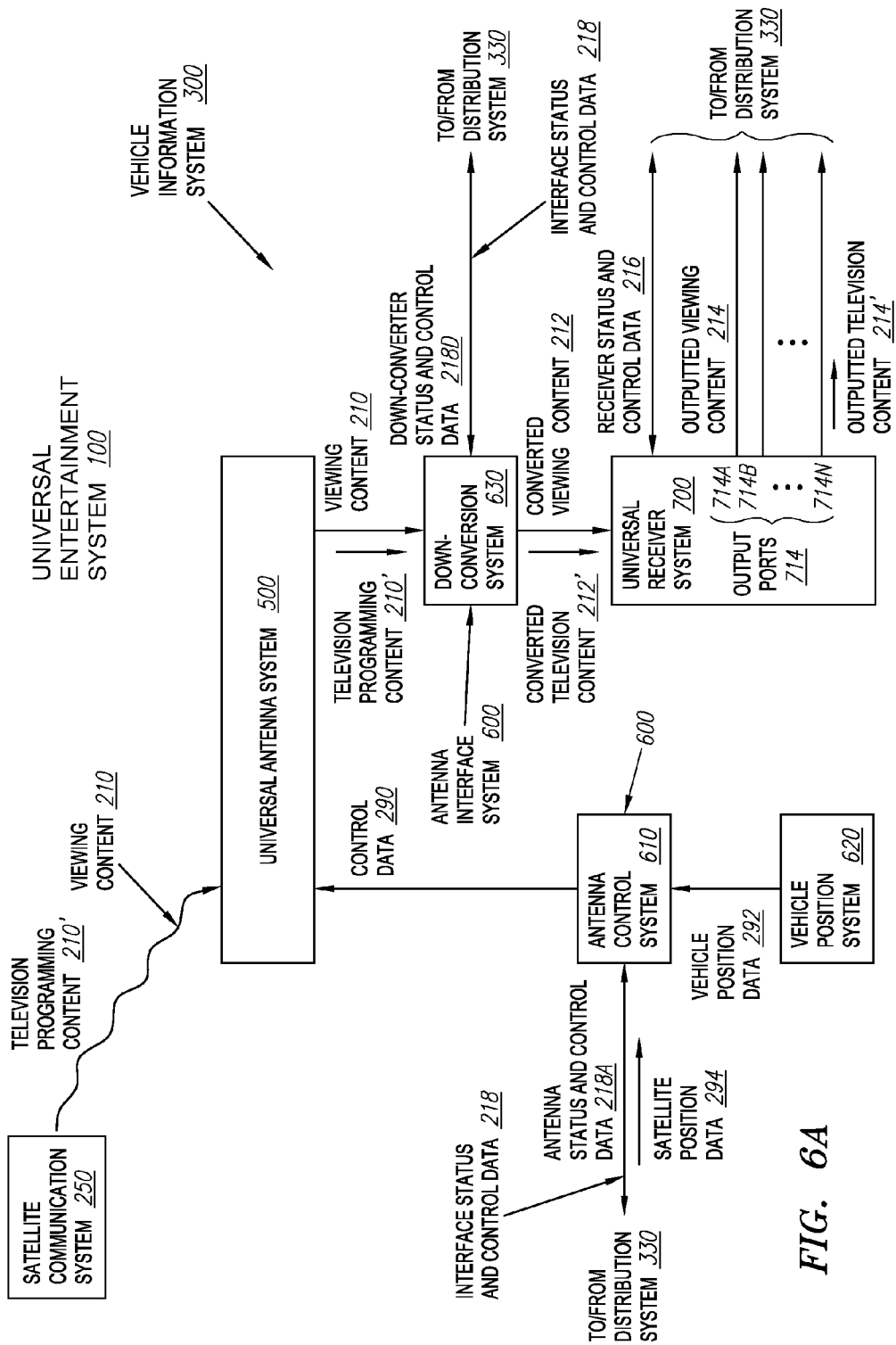
FIG. 6A is an exemplary block diagram illustrating an embodiment of the universal entertainment system of FIG. 5, wherein the vehicle information system includes an antenna control subsystem for directing the satellite communication system toward the satellite communication system and a down-conversion system for converting the viewing content into a form suitable for distribution throughout the vehicle information system.
Figure 6B:
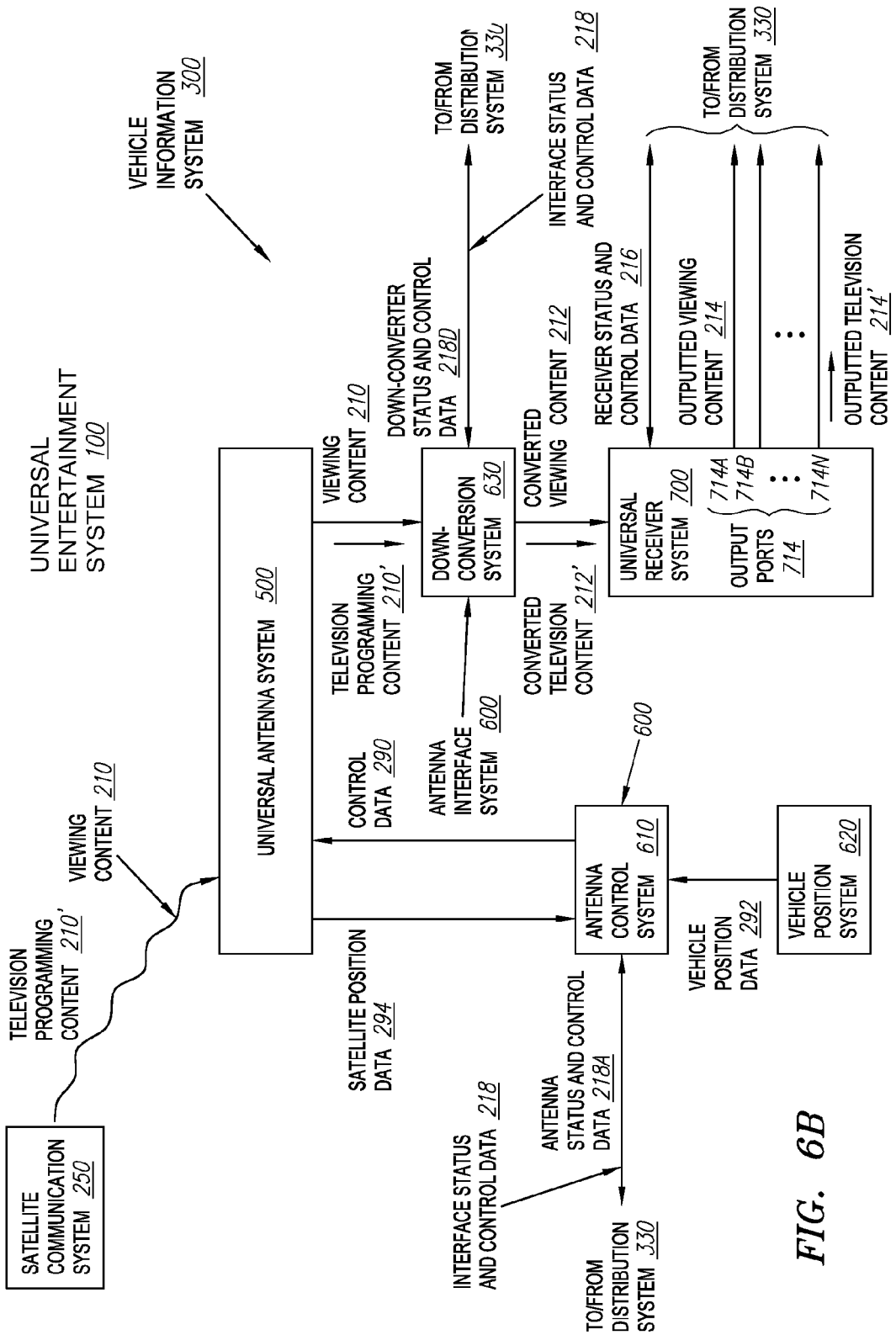
FIG. 6B is an exemplary block diagram illustrating an alternative embodiment of the universal entertainment system of FIG. 6A, wherein the antenna control subsystem directs the satellite communication system toward the satellite communication system based upon a comparison of vehicle position data and satellite position data.
Figure 6C:
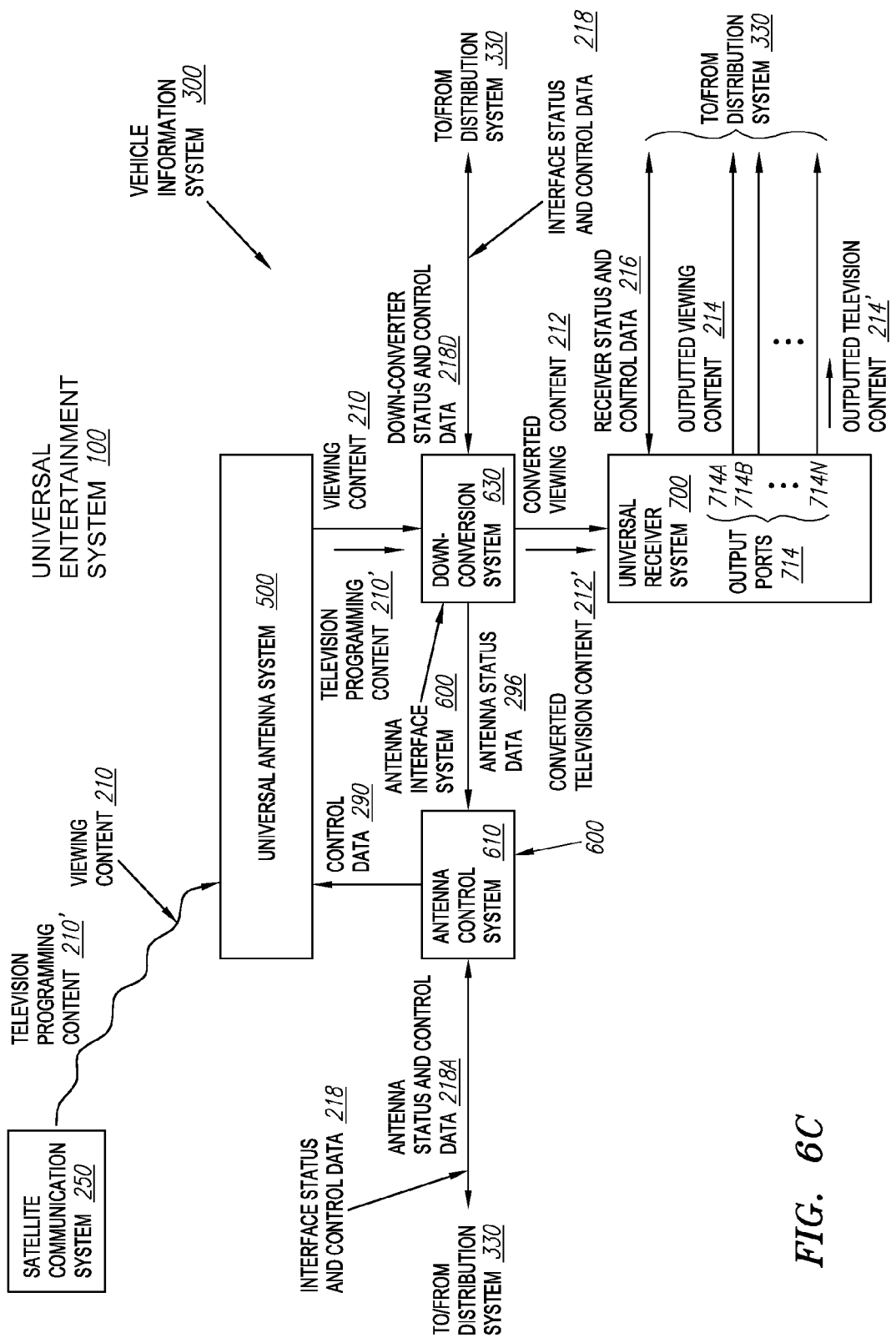
FIG. 6C is an exemplary block diagram illustrating another alternative embodiment of the universal entertainment system of FIG. 6A, wherein the antenna control subsystem directs the satellite communication system toward the satellite communication system based upon a feedback control signal provided by the down-conversion system.

In the manner discussed in more detail above with reference to FIG. 5, the vehicle information systems 300 of FIGS. 6A-C are shown being configured to receive and selectably present the viewing content 210, including the television programming content 210', via the satellite communication system 250. As the vehicle 400 (shown in FIGS. 2A-B) and, therefore, the vehicle information system 300 approach and/or enter coverage region 220 (shown in FIG. 1) of the satellite communication system 250, the antenna interface system 600 configures the multi-regional antenna subsystem 500 for receiving the television programming content 210'. For example, the antenna interface system 600 can receive the antenna control data 290 for directing the multi-regional antenna subsystem 500 toward the satellite communication system 250 as set forth above. The multi-regional antenna subsystem 500 thereby can communicate with the satellite communication system 250 upon entering, and during passage through, the coverage region 220 of the satellite communication system 250.

Turning to FIG. 6A, the antenna interface system 600 includes an antenna control subsystem 610 for initiating and/or maintaining communication between the multi-regional antenna subsystem 500 and the satellite communication system 250. The antenna control subsystem 610 can comprise any conventional type of antennal controller and can direct the multi-regional antenna subsystem 500 toward the satellite communication system 250 in any suitable manner. Operating under the control of the server system 310 (shown in FIGS. 2A-B), the antenna control subsystem 610 shown in FIG. 6A can exchange antenna status and control data 218A with the processor-based subsystem 312 (shown in FIG. 7) via the distribution system 330.

The antenna status and control data 218A can include, for example, positional instruction for directing the multi-regional antenna subsystem 500 and/or reception instruction for establishing one or more reception characteristics, such as a frequency range and/or a signal polarity, of signals to be received by the multi-regional antenna subsystem 500. Upon receiving the antenna status and control data 218A, the antenna interface system 600 can configure the multi-regional antenna subsystem 500 in accordance with the instruction provided by the processor-based subsystem 312. The processor-based subsystem 312 thereby can configure and control the multi-regional antenna subsystem 500 via the antenna status and control data 218A.

As illustrated in FIG. 6A, the antenna status and control data 218A can include satellite position data 294 for directing the multi-regional antenna subsystem 500. The antenna control subsystem 610 likewise is shown as receiving vehicle position data 292. The vehicle position data 292 is associated with a geographical position of the vehicle 400 (shown in FIGS. 2A-B) and, therefore, the vehicle information system 300; whereas, the satellite position data 294 includes positional information regarding the satellite communication system 250. Upon receiving vehicle position data 292 and the satellite position data 294, the antenna control subsystem 610 can compare the vehicle position data 292 and the satellite position data 294 to provide antenna control data 290 for orienting the multi-regional antenna subsystem 500. The antenna control subsystem 610 can monitor the vehicle position data 292 in real-time and adjust the orientation of the multi-regional antenna subsystem 500, as desired. Thereby, the antenna control subsystem 610 can provide an open-loop system for orienting the multi-regional antenna subsystem 500 and maintaining communication between the multi-regional antenna subsystem 500 and the satellite communication system 250 during travel.

The multi-regional antenna subsystem 500 thereby continually is directed toward the satellite communication system 250 regardless of the position and/or orientation of the vehicle 400. Advantageously, the antenna control subsystem 610 can maintain communication between the multi-regional antenna subsystem 500 and the satellite communication system 250 without requiring feedback, such as a signal strength determination, from the universal receiver system 700. To further ensure the pointing accuracy of the multi-regional antenna subsystem 500, the antenna control subsystem 610 can employ predictive algorithms, such as advanced second-order pointing algorithms, for directing the multi-regional antenna subsystem 500 toward the satellite communication system 250 as the vehicle 400 enters, and passes through, the associated coverage region 220 (shown in FIG. 1). Such predictive algorithms can prove to be beneficial for maintaining the pointing accuracy of the multi-regional antenna subsystem 500, particularly when the vehicle 400 experiences high rates of turn.

Since most travel involves travel in substantially straight lines, a typical predictive algorithm can predict a future position of the vehicle 400 (shown in FIGS. 2A-B) via calculations based upon prior vehicle position data 292 of the vehicle 400. During high rates of turn, however, the predictive algorithm preferably examines rate of change data (not shown) regarding the position of the vehicle 400 to predict a future position of the vehicle 400. The antenna control subsystem 610 thereby can direct the multi-regional antenna subsystem 500 toward the satellite communication system 250 based upon the rate of position change data while the vehicle 400 continues to experience the high rate of turn. After the turn, the predictive algorithm can return to predicting the future position of the vehicle 400 via the calculations based upon the prior vehicle position data 292, and the antenna control subsystem 610 make any correction to the orientation of the multi-regional antenna subsystem 500. The antenna control subsystem 610 thereby can maintain the pointing accuracy of the multi-regional antenna subsystem 500 during travel even if the vehicle 400 experiences high rates of turn.

The vehicle position data 292 and the satellite position data 294 can be provided in any conventional manner. As illustrated in FIG. 6A, vehicle position data 292 can be provided by a vehicle position system 620, such as a Global Positioning Satellite (GPS) system and/or an Inertial Reference System (IRS). Similarly, the satellite position data 294 can include ephemeras data for the satellite communication system 250 as stored by the server system 310 (shown in FIGS. 2A-B) and provided to the antenna control subsystem 610 via the distribution system 330. The server system 310 preferably includes a database system 316 (shown in FIG. 7) for storing and maintaining the satellite position data 294 for a plurality of preselected satellite communication systems 250. The server system 310 can store ephemeras data for any predetermined number of satellite communication systems 250, as desired.

The preselected satellite communication systems 250, for example, include at least one satellite communication system 250 having an associated coverage region 220 (shown in FIG. 1) through which the vehicle 400 expected to enter, and/or traverse, during travel. The database system 316 preferably comprises a complete database of information for each satellite communication system 250 within the expected region of travel for the vehicle 400. Illustrative database information can include the satellite position data 294, an associated coverage region 220, transponder frequency data, signal polarization data, symbol rate data, video and/or audio program identification (PID) data, electronic program guide (EPG) data, forward error correction (FEC) data, and/or Program Clock Reference PID (PCR-PID) data during satellite handoff operations, without limitation. For each satellite communication system 250, the database system 316 can store at least one contour boundary 222 (shown in FIG. 4) that is based upon a preselected signal strength (or signal power level). For instance, the contour boundary 222 can approximate a coverage region having a contour boundary 222 with an Effective Isotropic Radiated Power (EIRP) of approximately −48 dBW for each relevant satellite communication system 250.

To help ensure that the multi-regional antenna subsystem 500 is directed toward, and configured to communicate with, the relevant satellite communication system 250, the antenna control subsystem 610 continuously monitors the vehicle position data 292 in real time and, as needed, provides control data 290 for adjusting the orientation of the multi-regional antenna subsystem 500 as needed. As shown in FIG. 6B, the satellite position data 294 likewise can be provided by the multi-regional antenna subsystem 500. If the satellite communication system 250 includes a geostationary satellite, for example, the satellite position data 294 can comprise a fixed geographical location of the satellite communication system 250. As desired, the antenna control subsystem 610 likewise can provide the processor-based subsystem 312 (shown in FIG. 7) with antenna status data, the satellite position data 294, and/or the vehicle position data 292 via the antenna status and control data 218A.

Upon receiving the antenna status data and control data 218A from the antenna control subsystem 610, the processor-based subsystem 312 can compare the vehicle position data 292 with the appropriate contour boundary 222 for the relevant satellite communication system 250. The processor-based subsystem 312 thereby can provide suitable antenna control data for directing the multi-regional antenna subsystem 500. If the vehicle position data 292 remains within the appropriate contour boundary 222 for the current satellite communication system 250, the processor-based subsystem 312 can provide antenna control data for directing the multi-regional antenna subsystem 500 toward the current satellite communication system 250.

Similarly, the processor-based subsystem 312 can provide antenna control data for directing the multi-regional antenna subsystem 500 toward a different satellite communication system 250 when the vehicle position data 292 approaches the contour boundary 222 of the current satellite communication system 250. The different satellite communication system 250 preferably has a coverage region 220 through which the vehicle 400 expected to enter upon leaving the coverage region 220 of the current satellite communication system 250. If the vehicle 400 is not within the range of another satellite communication system 250, the processor-based subsystem 312 preferably provides antenna control data for continuing to direct the multi-regional antenna subsystem 500 toward the current satellite communication system 250 until the vehicle 400 enters the range of another satellite communication system 250.

As desired, the processor-based subsystem 312 likewise can monitor signal strength data associated with the received viewing content 210. The signal strength data can be provided by the universal receiver system 700 and communicated to the processor-based subsystem 312 via the receiver status and control data 216. The processor-based subsystem 312 thereby can be configured to continuously monitor the signal strength data of the received viewing content 210, preferably in conjunction with the vehicle position data 292. Thereby, if the signal strength data indicates that the signal strength of the received viewing content 210 is below a predetermined signal strength level as the vehicle position data 292 approaches the contour boundary 222 of the current satellite communication system, the processor-based subsystem 312 can determine that the vehicle 400 is traveling beyond the range of the current satellite communication system 250. The processor-based subsystem 312 therefore can provide antenna control data for directing the multi-regional antenna subsystem 500 toward a different satellite communication system 250 or, if the vehicle 400 is not within the range of another satellite communication system 250, the current satellite communication system 250 in the manner set forth above.

Illustrative antenna control data can include antenna azimuth data, antenna elevation data, and/or antenna polarization data for directing the multi-regional antenna subsystem 500 toward the appropriate satellite communication system 250. The processor-based subsystem 312 can provide the antenna control data to the satellite communication system 250 via the antenna status and control data 218A. The antenna control subsystem 610 can receive the antenna control data and can orient the multi-regional antenna subsystem 500 in accordance with the antenna control data. The multi-regional antenna subsystem 500 thereby can be continuously directed toward, and configured to communicate with, the relevant satellite communication system 250.

As desired, the antenna control subsystem 610 can employ feedback for orienting the multi-regional antenna subsystem 500 toward the satellite communication system 250. The antenna control subsystem 610 can comprise a conventional feedback control system and is illustrated in FIG. 6C as receiving an antenna status signal 296, derived from signals, such as the composite signals 260 (shown in FIG. 8A), as received from the satellite communication system 250. For example, the antenna status signal 296 can represent a signal strength of the composite signals 260 as received by the multi-regional antenna subsystem 500. Illustrative antenna control subsystems that employ feedback signals to direct antenna systems are disclosed in U.S. Pat. No. 5,790,175, entitled "AIRCRAFT SATELLITE TELEVISION SYSTEM FOR DISTRIBUTING TELEVISION PROGRAMMING DERIVED FROM DIRECT BROADCAST SATELLITES," issued to Sklar et al.; and U.S. Pat. No. 6,208,307, entitled "AIRCRAFT IN-FLIGHT ENTERTAINMENT SYSTEM HAVING WIDEBAND ANTENNA STEERING AND ASSOCIATED METHODS," issued to Frisco et al. The antenna control subsystem 610 thereby can initialize and/or maintain the communication between the multi-regional antenna subsystem 500 and the satellite communication system 250.

Returning to FIG. 6A, the antenna interface system 600 likewise is illustrated as including a down-conversion system 630 for converting the viewing content 210 into converted viewing content 212 that is suitable for use with the vehicle information system 300. For example, the satellite communication system 250 transmits the viewing content 210 within a predetermined first frequency band defined for conventional satellite communications. Upon receiving the viewing content 210 within the first frequency band, the down-conversion system 630 can convert the viewing content 210 into the converted viewing content 212 having a second frequency band that is compatible with the vehicle information system 300. Stated somewhat differently, the down-conversion system 630 can convert the viewing content 210 having a first band (or "block") of frequencies into the converted viewing content 212 having a second band (or "block") of frequencies, which typically comprises lower frequencies that the frequencies associated with the first frequency band. The converted viewing content 212 thereby can be distributed throughout the vehicle information system 300 without significant signal degradation. Preferably being disposed adjacent to the multi-regional antenna subsystem 500, the down-conversion system 630 provides the converted viewing content 212 to the universal receiver system 700, which may be disposed distally from the multi-regional antenna subsystem 500.

The universal receiver system 700 receives the converted viewing content 212 and includes one or more output ports (or viewing channels) 714 for providing preselected portions of the converted viewing content 212 as outputted viewing content 214. Including audio and/or video content from the viewing content 210, the outputted viewing content 214 can be provided in any conventional content format, including any analog and/or digital format, and preferably is multicast to the distribution system 330 as streamed viewing content by the output ports 714 substantially in real-time. Operating under the control of the server system 310 (shown in FIGS. 2A-B), the universal receiver system 700 can exchange receiver status and control data 216 with the processor-based subsystem 312 (shown in FIG. 7) via the distribution system 330. The server system 310 thereby can configure the universal receiver system 700 to select the appropriate portions of the converted viewing content 212 to be provided as the outputted viewing content 214 for each output port 714 of the universal receiver system 700. FIG. 6A shows the output ports 714 of the universal receiver system 700 as being in communication with the distribution system 330 such that the outputted viewing content 214 can be distributed throughout the vehicle information system 300. Therefore, in the manner discussed in more detail above, the passenger interfaces 320 (shown in FIGS. 2A-B) can select the outputted viewing content 214 for presentation and can present the selected viewing content 214, as desired.

In the manner discussed above with reference to FIG. 3, for example, the viewing content 210 can include the television programming content 210'. When the vehicle information system 300 is within the coverage region 220 of the satellite communication system 250, the antenna control subsystem 610 orient the multi-regional antenna subsystem 500 toward the satellite communication system 250 such that communication between the multi-regional antenna subsystem 500 and the satellite communication system 250 is maintained. The multi-regional antenna subsystem 500 thereby can receive the viewing content 210, including the television programming content 210', and provide the television programming content 210' to the down-conversion system 630. Upon receiving the television programming content 210', the down-conversion system 630 can convert the television programming content 210' into converted television content 212', within a predetermined frequency band, that is suitable for distribution throughout the vehicle information system 300 without significant signal degradation. The down-conversion system 630 can provide the converted television content 212', along with the converted viewing content 212, to the universal receiver system 700. Stated somewhat differently, the converted viewing content 212 includes the converted television content 212'.

The universal receiver system 700 receives the converted viewing content 212 and can select the appropriate portions of the converted viewing content 212 to be provided as the outputted viewing content 214 for each output port 714 in the manner set forth above. For example, the processor-based subsystem 312 can provide receiver status and control data 216 for configuring the universal receiver system 700 to provide the converted television content 212' as outputted television content 214' on a selected output port 714, such as output port 714N, as illustrated in FIG. 6A. In accordance with the receiver status and control data 216, the universal receiver system 700, upon receiving the converted viewing content 212, selects the converted television content 212' from the converted viewing content 212, and provides the converted television content 212' as outputted television content 214' to the selected output port 714N. The output port 714N provides the outputted television content 214' to the distribution system 330 for distribution throughout the vehicle information system 300 in the manner set forth above. The outputted television content 214' thereby can be selected for presentation and presented via the passenger interfaces 320.

A detail drawing of one illustrative embodiment of the universal entertainment system 100 is shown in FIG. 7 and will be discussed in conjunction with FIGS. 8A-B, 9A-C, 10A-B, and 11A-B. Turning to FIG. 7, the universal entertainment system 100 is configured for installation onboard an aircraft 420 (shown in FIG. 2B) and includes a multi-regional antenna subsystem 500, provided in the manner discussed above with reference to FIGS. 3 and 4A-B, for receiving viewing content 210, such as television programming content 210'. As shown in FIG. 7, the multi-regional antenna subsystem 500 is shown as being disposed under, and protected by, a radome 510. Preferably being adapted for installation on an exterior surface 440 (shown in FIG. 2B) of the fuselage 430 (shown in FIG. 2B) of the aircraft 420, the radome 510 is configured to provide aerodynamic protection for the antenna system 500 without impeding receipt of the viewing content 210. Thereby, the radio-frequency (RF) performance of the multi-regional antenna subsystem 500 can be optimized.

Likewise being adapted for installation on the fuselage 430 of the aircraft 420, the multi-regional antenna subsystem 500 can include at least one antenna element 520 for receiving the viewing content 210. Each antenna element 520 can be provided as a conventional antenna element and preferably comprises a high-gain, regional antenna element for receiving signals comprising the viewing content 210 provided by the satellite communication system 250. Exemplary antenna elements 520 can comprise at least one dish antenna, a frequency selective surfaces (FSS) antenna, and/or a phased array antenna, without limitation. If the vehicle information system 300 the vehicle information system 300 is installed on an aircraft 420 (shown in FIG. 2B), for example, the multi-regional antenna subsystem 500 can comprise a conventional airborne antenna system, such as the Airborne Antenna System Model No. FSS 2760 as manufactured by Datron Advanced Technologies Inc., of Simi Valley, Calif. as shown in FIG. 8B. The multi-regional antenna subsystem 500 of FIG. 8B is illustrated as having a plurality of hemispherical lenses 525 and a feedstick assembly 570. The feedstick assembly 570 travels over the exterior surface of the hemispherical lenses 525 and includes a plurality of sensors (not shown) for collecting the satellite signals focused by the hemispherical lenses 525.

The viewing content 210 can be provided as a plurality of composite signals 260 as shown in FIG. 8A. The composite signals 260 are illustrated as being a pair of oppositely-polarized signals 260A, 260B, which can be simultaneously received by the antenna element 520. When the viewing content 210 comprises television programming content 210', for example, the viewing content 210 can be provided as a pair of oppositely-polarized direct broadcast satellite (DBS) signals within the Ku-Band (10.7 GHz-12.75 GHz). The oppositely-polarized signals 260A, 260B can be polarized in any conventional manner, including continuously steered linear (horizontal and vertical) polarization and/or circular (left-hand circular and right-hand circular) polarization. Preferably, the antenna element 520 can be controlled to selectably receive oppositely-polarized signals 260A, 260B with a predetermined polarity. The antenna element 520 likewise can be controllable to selectably receive oppositely-polarized signals 260A, 260B within a predetermined frequency band.

The polarity and frequency band of the oppositely-polarized signals 260A, 260B to be received by the antenna element 520 can be selected in any conventional manner, such as being software selectable and/or included with the antenna control data 290 provided by the antenna control subsystem 610 of the antenna interface system 600. The antenna control subsystem 610 can provide the antenna control data 290 in the manner set forth in more detail above with reference to FIGS. 6A-C. For example, the antenna control subsystem 610 can provide the processor-based subsystem 312 (shown in FIG. 7) with the vehicle position data 292 via the antenna status and control data 218A, and the processor-based subsystem 312 can compare the vehicle position data 292 with the appropriate contour boundary 222 (shown in FIG. 4) for the relevant satellite communication system 250. The processor-based subsystem 312 thereby can provide suitable antenna status and control data 218A for configuring the multi-regional antenna subsystem 550 for receiving the oppositely-polarized signals 260A, 260B.

If the pair of oppositely-polarized are within the Ku-Band (10.7 GHz-12.75 GHz), for example, the antenna element 520 can be configured to receive oppositely-polarized signals 260A, 260B within a selected frequency sub-band within the Ku-Band. The Ku-Band can be divided into any suitable number of frequency sub-band, each frequency sub-band have a predetermined frequency sub-band range. Illustrative frequency sub-bands within the Ku-Band can include a first frequency sub-band, such as between approximately 10.7 GHz and 11.7 GHz, and a second frequency sub-band, such as between approximately 11.7 GHz and 12.75 GHz. By configuring the antenna element 520 to be controllable to receive signals within a selected frequency band, the antenna element 520 advantageously can operate with increased efficiency and can be provided as a small, low-profile antenna element even in regions where the signals have low power levels.

Upon receiving can receive the viewing content 210, the antenna element 520 can focus the received viewing content 210 via a conventional feed assembly (not shown). The multi-regional antenna subsystem 500 of FIG. 8A likewise includes a preamplification system 530 for amplifying the received viewing content 210. If the viewing content 210 is provided as a pair of oppositely-polarized signals 260A, 260B as discussed above, the preamplification system 530 can include a pair of low-noise amplifiers (LNAs) 530A, 530B for amplifying the pair of oppositely-polarized signals 260A, 260B as illustrated in FIG. 8A. The received viewing content 210 thereby is boosted for transmission, preferably via a low-loss cable system (not shown). The preamplification system 530 provides the pair of amplified signals 262A, 262B to a vector modulator assembly 540. Operating under the control of the antenna control subsystem 610 of the antenna interface system 600, the vector modulator assembly 540 provides amplitude and/or phase modulation for the pair of amplified signals 262A, 262B. The pair of modulated, amplified signals 264A, 264B then is provided to the down-conversion system 630 via a rotary joint 550 for conversion into viewing content 212 that is suitable for use with the vehicle information system 300 in the manner discussed above with reference to FIG. 6A.

The vector modulator assembly 540 can be provided in any conventional manner and is reconfigurable to receive and, as desired, process the composite signals 260 having a selected polarity. In the manner set forth in more detail above with reference to FIGS. 6A-C, for example, the processor-based subsystem 312 can compare the vehicle position data 292 of the vehicle 400 with the appropriate contour boundary 222 for the relevant satellite communication system 250 and thereby can provide suitable antenna status and control data 218A for configuring the vector modulator assembly 540 to receive and process the composite signals 260. As illustrated in FIG. 8C, vector modulator assembly 540 can include a switching system 542, a polarization system 544, and/or a multiplexer system 546. The switching system 542 can receive the pair of amplified signals 262A, 262B from the preamplification system 530 and process the amplified signals 262A, 262B in accordance with the control data 290 provided by the antenna control subsystem 610. If the pair of amplified signals 262A, 262B comprise linear polarized signals, such as a horizontally polarized signal 262H and a vertically polarized signal 262V, the switching system 542 can provide the linear polarized signals to the polarization system 544.

The polarization system 544 can be provided in any conventional manner, including as an electronic polarization system and/or a mechanical polarization system, and is configured to maintain the polarization angle between the linear polarized signals 262H, 262V. Operating under the control of the antenna control subsystem 610, the polarization system 544 can phase shift one of the linear polarized signals 262H, 262V relative to the other linear polarized signal 262H, 262V. The polarization system 544 thereby can help ensure that the linear polarized signals 262H, 262V remain orthogonal to each other. Upon phase shifting the linear polarized signals 262H, 262V, the polarization system 544 can provide the phase-shifted linear polarized signals 262H, 262V as orthogonal linear polarized signals 262H', 262V' to the multiplexer system 546 as shown in FIG. 8C.

The pair of amplified signals 262A, 262B likewise can be provided as circular polarized signals. As illustrated in FIG. 8C, the pair of amplified signals 262A, 262B include a left-hand circular polarized signal 262L and a right-hand circular polarized signal 262R, the switching system 542 can provide the circular polarized signals 262L, 262R to the polarization system 544. In accordance with the control data 290, the switching system 542 can provide the circular polarized signals 262L, 262R directly to the multiplexer system 546. The multiplexer system 546 is shown as operating under the control of the antenna control subsystem 610 and thereby can select the pair of orthogonal linear polarized signals 262H', 262V' or the pair of circular polarized signals 262L, 262R to provide to the down-conversion system 630 as the pair of modulated, amplified signals 264A, 264B.

The multi-regional antenna subsystem 500 likewise can include an antenna steering system 560 for directing (or orienting) the antenna elements 520 toward the satellite communication system 250 regardless of the position and/or orientation of the aircraft 420. Thereby, the multi-regional antenna subsystem 500 can maintain communication with the satellite communication system 250 in the manner set forth in more detail above with reference to FIG. 5. The multi-regional antenna subsystem 500 can include, for example, mechanically-steered antenna elements and/or electronically-steered antenna elements such that the antenna steering system 560 can be provided in any conventional manner. As desired, the antenna steering system 560 can be configured to independently direct each antenna element 520 and/or to jointly direct at least one group of two or more of the antenna elements 520. By independently directing one or more antenna elements 520, the multi-regional antenna subsystem 500 can be configured to simultaneously communicate with one or more satellite communication system 250.

The antenna steering system 560 is illustrated in FIGS. 8B and 10A as including one or more motor systems. For example, the antenna steering system 560 can include an azimuth motor system 560A for driving the azimuth of the multi-regional antenna subsystem 500 and/or an elevation motor system 560E for driving the elevation of the multi-regional antenna subsystem 500. The antenna steering system 560 can include additional motor systems, as desired, including a polarization motor system (not shown) for driving the polarization of the multi-regional antenna subsystem 500. If provided as stepper motor systems, for example, the azimuth motor system 560A can be provided as a National Electrical Manufacturers Association (NEMA) Size 23 high-torque stepper motor; whereas, an exemplary elevation motor system 560E can include a NEMA Size 17 high-torque stepper motor.

As shown in FIGS. 8A and 10A, the antenna steering system 560 can be controlled via the antenna control subsystem 610 of the antenna interface system 600. In the manner discussed above with reference to the antenna control data 290, the antenna control subsystem 610 receives vehicle position data 292 from a vehicle position system 620 and satellite position data 294 from the multi-regional antenna subsystem 500. The antenna control subsystem 610 can compare the vehicle position data 292 and the satellite position data 294 to provide the antenna control data 290, which is provided to the antenna steering system 560. As desired, the antenna control data 290 can include one or more control data components for controlling the various motor systems of the antenna steering system 560. The antenna control data 290 as illustrated in FIG. 10A, for example, includes azimuth antenna control data 290A for controlling the azimuth motor system 560A and elevation antenna control data 290E for controlling the elevation motor system 560E. The antenna control subsystem 610 thereby can control the azimuth and elevation of the multi-regional antenna subsystem 500 such that the multi-regional antenna subsystem 500 is directed toward, and maintains communication with, the satellite communication system 250 in the manner set forth in more detail above.

It will be appreciated that the antenna steering system 560 may require initial and/or periodic calibration for further assuring that communication between the multi-regional antenna subsystem 500 and the satellite communication system 250 is maintained. Although the antenna steering system 560 can be calibrated in any conventional manner, including via manual calibration, the antenna steering system 560 preferably is automatically calibrated. For example, when the vehicle information system 300 is initialized, the absolute geographical position of the aircraft 420 and, therefore, the vehicle information system 300, can be determined by cycling each axis until a fixed position detection switch (not shown) is activated. The antenna control subsystem 610 thereby can establish a "zero-reference" position for the aircraft 420 and maintain the current geographic position of the aircraft 420 by making discrete positional steps relative to the "zero-reference" position.

The antenna steering system 560 likewise can be calibrated by sampling the viewing content 210 received via the satellite communication system 250 at a plurality of different vehicle orientations as illustrated in FIGS. 9A-C. One or more selected signal characteristics, such as a signal strength, of the viewing content 210 can be determined for each vehicle orientation. The viewing content 210 can be sampled and the selected signal characteristics can be determined for any suitable number of vehicle orientations. Preferably, the signal strength of the viewing content 210 is sampled from at least three vehicle orientations, each which are separated by an angular displacement at least ninety degrees. For example, the antenna control subsystem 610 can sample the signal strength of the viewing content 210 with the aircraft 420 pointing west, north, and south prior to travel.

FIG. 9A shows the vehicle information system 300 sampling the viewing content 210 received via a selected satellite communication system 250 while the aircraft 420 is oriented in a first direction D1. The aircraft 420 subsequently is oriented in a second direction D2, which comprises an angular displacement of the aircraft 420 by a first predetermined angle $\theta_{12}$ from the first direction D1 as illustrated in FIG. 9B. The vehicle information system 300 again samples the viewing content 210 received via the selected satellite communication system 250 with the aircraft 420 oriented in the second direction D2. Thereafter, the aircraft 420 can be oriented in a third direction D3, which comprises an angular displacement of the aircraft 420 by a second predetermined angle $\theta_{23}$ from the second direction D2 as shown in FIG. 9C, and the vehicle information system 300 can again sample the viewing content 210. It will be appreciated that the predetermined angles $\theta_{12}$, $\theta_{23}$ between the successive directions D1, D2, D3 can be uniform and/or different.

The viewing content 210 can be sampled for additional vehicle orientations, as desired. For each of the directions D1, D2, D3 of the aircraft 420, the selected signal characteristics of the viewing content 210 are determined from the sampled viewing content 210. The antenna control subsystem 610 thereby can provide one or more software offset values representing the offset of the position of the satellite communication system 250 relative to the current geographical position of the aircraft 420 and, therefore, the vehicle information system 300 via closed-loop tracking During subsequent travel, the antenna control subsystem 610 can maintain communication between the multi-regional antenna subsystem 500 and the satellite communication system 250 by tracking the geographical position of the aircraft 420 and applying the software offset values.

In the manner discussed above with reference to FIGS. 5 and 6A-C, the antenna control subsystem 610 can configure the multi-regional antenna subsystem 500 for receiving the viewing content 210 from the satellite communication system 250. Turning to FIGS. 10A-B, the antenna control subsystem 610 is shown as providing antenna control data 290 and antenna power 298 to the multi-regional antenna subsystem 500. The antenna control subsystem 610 can communicate with the processor-based subsystem 312 (shown in FIG. 7) to exchange the interface status and control data 218 in any conventional manner, including via the wired and/or wireless distribution system 330. Preferably, the antenna control subsystem 610 and the processor-based subsystem 312 are coupled via at least one serial communication connection, such as a serial communication link in accordance with Electronic Industries Alliance (EIA) Standard RS-232 and/or Electronic Industries Alliance (EIA) Standard RS-485, and/or an Ethernet communication connection, including Fast Ethernet (such as 100Base-SX and/or 100Base-T) and/or Gigabit (such as 1000Base-SX and/or 1000Base-T) Ethernet. The antenna control subsystem 610 thereby can receive the antenna status and control data 218A, including the satellite position data 294, from the processor-based subsystem 312.

The antenna control subsystem 610 likewise can communicate with the vehicle position system 620 in any suitable manner to receive the vehicle position data 292 in the manner set forth in more detail above. The antenna control subsystem 610 and the vehicle position system 620 preferably communicate via an ARINC 429 bus as shown in FIG. 10A. To configure the multi-regional antenna subsystem 500, the antenna control subsystem 610 can provide the antenna control data 290 to the multi-regional antenna subsystem 500 in any conventional manner. The antenna control subsystem 610 preferably provides the antenna control data 290 to the multi-regional antenna subsystem 500 via at least one serial communication connection, such as a serial communication link in accordance with Electronic Industries Alliance (EIA) Standard RS-232 and/or Electronic Industries Alliance (EIA) Standard RS-485.

For example, the antenna control subsystem 610 can provide positioning control to the multi-regional antenna subsystem 500. When in a listening mode, the antenna control subsystem 610 can convert the vehicle position data 292, such as a geographical location and/or an attitude, for the vehicle 400 (shown in FIGS. 2A-B) into azimuth antenna control data 290A and/or elevation antenna control data 290E based upon the satellite position data 294. In the manner discussed above, the antenna control subsystem 610 can receive the satellite position data 294 from the processor-based subsystem 312 and/or the multi-regional antenna subsystem 500. As desired, the antenna control subsystem 610 can receive input power 618I and provide the antenna power 298 to the multi-regional antenna subsystem 500. The antenna control subsystem 610 likewise can distribute power to other functional components, such as the down-conversion system 630, of the vehicle information system 300.

One preferred embodiment of the antenna control subsystem 610 is illustrated in FIG. 10B. The antenna control subsystem 610 is shown as including an axis control PCBA 612 for receiving the status and control data 218, including the antenna status and control data 218A and/or the satellite position data 294, from the processor-based subsystem 312 (shown in FIG. 7). Operating under the control of a processing system 614, the axis control PCBA 612 likewise can the control data 290, including the azimuth antenna control data 290A and/or elevation antenna control data 290E, to the multi-regional antenna subsystem 500. As desired, the status and control data 218 can include down-converter status and control data 218D, which the axis control PCBA 612 can provide to the down-conversion system 630. The processing system 614 can be provided in any conventional manner and preferably comprises a single-board computer (SBC) as shown in FIG. 10B. The antenna control subsystem 610 further can include one or more interface cards for facilitation communication between the antenna control subsystem 610 and other functional components. As illustrated in FIG. 10B, for example, the antenna control subsystem 610 can be provided with an ARINC interface card 616 for coupling the vehicle position system 620 and the processing system 614.

Upon being directed toward, and/or configured to communication with, the satellite communication system 250, the multi-regional antenna subsystem 500 can receive the viewing content 210. In the manner discussed above with reference to the multi-regional antenna subsystem 500 (shown in FIG. 8A), the multi-regional antenna subsystem 500 can provide the viewing content 210 as a pair of modulated, amplified signals 264A, 264B to the down-conversion system 630. The down-conversion system 630 thereby can convert the pair of modulated, amplified signals 264A, 264B into a pair of converted signals 266A, 266B suitable distribution throughout the vehicle information system 300. Stated somewhat differently, the down-conversion system 630 can convert (or frequency shift) the pair of high-frequency signals 264A, 264B within the Ku-Band (10.7 GHz-12.75 GHz) into a pair of intermediate-frequency (or low-frequency) signals 266A, 266B within a predetermined intermediate-frequency (or low-frequency) band, such as the L-Band (950 MHz-2150 MHz). When converted into the intermediate-frequency signals 266A, 266B, the viewing content 210 can be distributed within the vehicle information system 300 without significant cable loss and/or signal degradation.

It will be appreciated that, due to the very high frequencies associated with the Ku-Band, distribution of the pair of signals 264A, 264B through long cabling (or fiber) systems (not shown) is not practical, even via low-impedance coaxial cables. The down-conversion system 630 therefore should be disposed within a close proximity to the multi-regional antenna subsystem 500, such as within approximately ten feet. By converting the pair of high-frequency signals 264A, 264B into the pair of intermediate-frequency signals 266A, 266B, the intermediate-frequency signals 266A, 266B can be distributed over longer distances via the cabling systems than can the pair of high-frequency signals 264A, 264B. Thus, the down-conversion system 630 converts the pair of high-frequency signals 264A, 264B into the pair of intermediate-frequency signals 266A, 266B, which are suitable distribution within the vehicle information system 300.

The down-conversion system 630 can be provided in any conventional manner, such as via one or more down-converters, as desired. Preferably, the down-conversion system 630 comprises a configurable down-conversion system and operates directly and/or indirectly under the control of the processor-based subsystem 312 (shown in FIG. 7). An exemplary down-conversion system 630 the low noise block down-converter assembly manufactured as Model No. 43740-1 by Norsat International Inc., of Burnaby, British Columbia, Canada. In the manner discussed in more detail above with reference to the antenna control subsystem 610, the down-conversion system 630 can exchange interface status and control data 218, such as the down-converter status and control data 218D, with the processor-based subsystem 312. The down-conversion system 630 can communicate with the processor-based subsystem 312 in any conventional manner. For example, the down-conversion system 630 and the processor-based subsystem 312 can communicate via the distribution system 330 as shown in FIG. 5 and/or via the antenna control subsystem 610 as illustrated in FIG. 8A. Therefore, the processor-based subsystem 312 and/or the antenna control subsystem 610 can configure the down-conversion system 630, as desired, to down-convert the pair of high-frequency signals 264A, 264B.

The down-conversion system 630, for instance, can be configured to selectably down-convert (or frequency shift) the pair of high-frequency signals 264A, 264B. In the manner set forth in more detail above with reference to the multi-regional antenna subsystem 500 (shown in FIGS. 8A-B), the multi-regional antenna subsystem 500 can be configured to operate in a selected frequency sub-band among a plurality of frequency sub-bands of a predetermined high-frequency band. For example, the Ku-Band (10.7 GHz-12.75 GHz) can be divided into a plurality of frequency sub-bands, such as the first frequency sub-band (10.7 GHz and 11.7 GHz) and/or the second frequency sub-band (11.7 GHz and 12.75 GHz), as discussed above with reference to FIG. 8A. The down-conversion system 630 likewise can convert the pair of high-frequency signals 264A, 264B into the pair of intermediate-frequency signals 266A, 266B within a selected frequency sub-band among a plurality of frequency sub-bands of a predetermined intermediate-frequency band.

When the predetermined intermediate-frequency band comprises the L-Band (950 MHz-2150 MHz), the L-Band can be divided into a plurality of intermediate-frequency sub-bands. Illustrative intermediate-frequency sub-bands can include a first low frequency sub-band (950 MHz and 1950 MHz) and/or a second low-frequency sub-band (1100 MHz and 2150 MHz). Therefore, the down-conversion system 630 can convert the pair of high-frequency signals 264A, 264B in a predetermined high-frequency sub-band of the Ku-Band into the pair of intermediate-frequency signals 266A, 266B within a corresponding low-frequency sub-band of the L-Band. An exemplary relationship between the pair of high-frequency signals 264A, 264B and the pair of intermediate-frequency signals 266A, 266B that can be provided via the down-conversion system 630 is illustrated in Table 1 when the Ku-Band and the L-Band each are divided into two frequency sub-bands.

TABLE 1

Exemplary Down-Conversion from High-Frequency Signals to Low-Frequency Signals

|  | Low-Frequency Sub-Band | High-Frequency Sub-Band |
| --- | --- | --- |
| Antenna Ku-Band Reception | 10.7 GHz to 11.7 GHz | 11.7 GHz to 12.75 GHz |
| Down-Conversion LO Frequency | 9.75 GHz | 10.6 GHz |
| L-Band Operation | 950 MHz to 1950 MHz | 1100 MHz to 2150 MHz |

The selected frequency sub-band can be selected via the down-converter status and control data 218D in the manner set forth above. The down-conversion system 630 thereby can be configured to convert the pair of high-frequency signals 264A, 264B within the selected high-frequency sub-band within the Ku-Band into the pair of intermediate-frequency signals 266A, 266B within an associated low-frequency sub-band within the L-Band. In the manner set forth in more detail above with reference to FIGS. 6A-C, for example, the processor-based subsystem 312 can compare the vehicle position data 292 of the vehicle 400 with the appropriate contour boundary 222 for the relevant satellite communication system 250 and thereby can provide suitable antenna status and control data 218A for configuring the down-conversion system 630 to convert the pair of high-frequency signals 264A, 264B in a suitable manner. The down-conversion system 630 likewise can receive power 618O from the antenna control subsystem 610 in the manner discussed above with reference to the antenna control subsystem 610 (shown in FIGS. 10A-B). In addition, or alternatively, the down-conversion system 630 can derive power from a direct current (DC) offset voltage, such as nineteen volts (19 VDC), that is supplied on the L-Band outputs. The universal receiver system 700 (shown in FIG. 7) likewise can provide power the down-conversion system 630 by driving the offset voltage on its L-Band input nodes.

The down-conversion system 630 likewise can include an amplification system 632 for amplifying the pair of intermediate-frequency signals 266A, 266B as shown in FIG. 10A. In the manner discussed in more detail above with reference to the preamplification system 530 of the multi-regional antenna subsystem 500 (shown in FIG. 8A), the amplification system 632 can include a predetermined number of low-noise amplifiers (LNBs) 632A, 632N. Each low-noise amplifier 632A, 632N can be provided in any conventional manner and is configured to amplify one of the intermediate-frequency signals 266A, 266B. The pair of intermediate-frequency signals 266A, 266B thereby can be boosted for transmission to the universal receiver system 700.

Returning again to FIG. 7, the universal receiver system 700 is illustrated as receiving the pair of intermediate-frequency signals 266A, 266B provided by the down-conversion system 630. Since the pair of intermediate-frequency signals 266A, 266B can be distributed over longer distances as discussed above, the universal receiver system 700 may be provided at any suitable location on the vehicle 400 (shown in FIGS. 2A-B), as desired. The universal receiver system 700 therefore can be disposed adjacent to the antenna interface system 600 at a head-end of the vehicle 400 and/or distally from the antenna interface system 600 at a back-end (or tail-end) of the vehicle 400. For example, the universal receiver system 700 can be disposed adjacent to the passenger seat groups 360 (shown in FIG. 12), including within at least one handheld presentation system 326 (shown in FIG. 12).

If disposed with the handheld presentation systems 326, the handheld presentation systems 326 can be provided in the manner set forth in the above-referenced co-pending U.S. patent application, entitled "PORTABLE MEDIA DEVICE AND METHOD FOR PRESENTING VIEWING CONTENT DURING TRAVEL," Ser. No. 11/154,749, filed on Jun. 15, 2005. Each handheld presentation system 326 can be provided in any conventional manner, such as a laptop computer, a palmtop computer, and/or a personal digital assistant (PDA), and preferably comprises a wireless, hand-held television appliance. The handheld presentation systems 326 likewise can include at least one television receiver system (not shown). Thereby, the handheld presentation systems 326 can be configured to receive and, as desired, decode the pair of intermediate-frequency signals 266A, 266B provided by the multi-regional antenna subsystem 500 via the antenna interface system 600.

The universal receiver system 700 is shown in FIGS. 7 and 11A-B as including a plurality of direct broadcast satellite (DBS) television receiver (DTR) systems 710. Each DBS television receiver system 710 can simultaneously receive and decode one or more DBS television channels, providing the decoded DBS television channels in any conventional audio and/or video format. For example, the DBS television receiver systems 710 each can provide the decoded DBS television channels in an analog format and/or a digital format. Illustrative analog audio and/or video formats can include a National Television System Committee (NTSC) standard format, a Phase Alternating Line (PAL) standard format, and/or a Sequential Couleur Avec Memoire (or Sequential Colour with Memory) (SECAM) standard format; whereas, a Moving Picture Experts Group (MPEG-1, MPEG-2, MPEG-4) transport stream is an exemplary digital audio and/or video format. The decoded DBS television channels preferably are suitable for distribution throughout the vehicle information system 300 via a distribution system 330 and presentation via the passenger interfaces 320 (shown in FIGS. 2A-B).

In a preferred embodiment, the universal receiver system 700 includes three DBS television receiver systems 710, each being configured to provide up to twelve or more DBS television channels. The architecture of the DBS television receiver systems 710 can be uniform and/or different among the DBS television receiver systems 710, as desired. As illustrated in FIG. 7, the universal receiver system 700 can provide the DBS television receiver systems 710 in a radio frequency (RF) chain. Comprising uniform DBS television receiver systems 710, each DBS television receiver system 710 is shown as including an intermediate frequency (IF) multiplexer (and/or splitter) system 720, at least one DBS receiver module (DRM) 730, at least one media encoder system 740, and an Ethernet switch system 750. In the manner discussed above with reference to FIG. 6A-C, each DBS television receiver system 710 of the universal receiver system 700 preferably operates under the control of the server system 310, exchanging receiver status and control data 216 with the processor-based subsystem 312 via the distribution system 330. For example, the processor-based subsystem 312 can compare the vehicle position data 292 of the vehicle 400 with the appropriate contour boundary 222 for the relevant satellite communication system 250 and thereby can provide suitable receiver status and control data 216 for configuring the universal receiver system 700 to receive and process the incoming pair of converted signals 266A, 266B, as desired.

Within each DBS television receiver system 710, the intermediate frequency multiplexer 720 can receive the incoming pair of converted signals 266A, 266B and distribute the converted signals 266A, 266B among the associated DBS receiver modules 730, as desired, as individual L-band signals 268. Each DBS receiver module 730 receives the suitable individual L-band signal 268 and selects an appropriate polarization, such as a vertical/right-hand polarization and/or a horizontal/left-hand polarization, of the received L-band signal 268. The DBS receiver module 730 can select the appropriate polarization of the received L-band signal 268 in any conventional manner, including via the application of a signal, such as a direct current voltage, on a selection input port (not shown). Preferably, the direct current voltage can be applied to the L-band signal 268 provided to the DBS receiver module 730. As desired, the intermediate frequency multiplexer 720 in the first DBS television receiver system 710' in the radio frequency (RF) chain can provide power 618O (shown in FIG. 10A) to the down-conversion system 630 in the manner set forth above with reference to FIGS. 10A-B.

If one or more of the DBS television receiver systems 710 in the universal receiver system 700 loses power or otherwise fails, the remaining DBS television receiver systems 710 preferably can continue to operate normally. The intermediate frequency multiplexers 720 can be provided in a manner to facilitate the robustness of the universal receiver system 700. For example, the intermediate frequency multiplexer 720 in a failing DBS television receiver system 710 preferably can be disabled (or powered down) by another DBS television receiver system 710, which is downstream in the radio frequency (RF) chain from the failing DBS television receiver system 710. The intermediate frequency multiplexer 720 in the failing DBS television receiver system 710 likewise can pass the incoming pair of converted signals 266A, 266B to the downstream DBS television receiver systems 710. The downstream DBS television receiver systems 710 thereby can continue to function despite the failing DBS television receiver system 710. Further, the intermediate frequency multiplexer 720 in the failing DBS television receiver system 710 preferably continues to supply power to any upstream DBS television receiver systems 710 and/or the down-conversion system 630.

Preferably being provided as an equivalent to a television set-top converter box, each DBS receiver module 730 receives the L-band signal 268 from the intermediate frequency multiplexer 720. Upon receiving the L-band signal 268, the DBS receiver module 730 can decode the L-band signal 268 to provide a single channel 269 of direct broadcast satellite (DBS) programming. The DBS receiver module 730 likewise can provide an analog audio and/or video outputs, such as analog stereo audio outputs and/or an NTSC (or PAL or SECAM) analog video output, as desired. Each DBS receiver module 730 can be electrically and/or mechanically configured for use as any conventional type of DBS receiver system, including as a custom DBS receiver system and/or as a commercial off-the-shelf (or COTS) DBS receiver system. Preferably, each DBS receiver module 730 is configurable to receive "free-to-air" (or unencrypted) content and/or premium (or encrypted) content. Since each DBS television receiver system 710 can operate under the control of the server system 310, reconfiguration of the DBS receiver module 730 preferably is automatic and requires no (or limited) manual intervention.

Each DBS television receiver system 710 preferably includes one media encoder system 740 for each DBS receiver module 730. Each media encoder system 740 can be provided in any conventional manner and can be configured to convert the analog audio and/or video outputs of the associated DBS receiver module 730 into, for example, a multicast Ethernet MPEG-2 transport stream suitable for distribution throughout the vehicle information system 300 via the distribution system 330. As desired, the encoder systems 740 can be configured to simultaneously process a plurality of video signals and/or a plurality of audio signals and preferably can simultaneously process twelve video signals and two audio signals. The encoder systems 740 thereby can provide the outputted television content 214' to the distribution system 330 in the manner discussed in more detail above with reference to FIGS. 6A-C. The outputted television content 214' thereby can be selected and presented via the passenger interfaces 320 (shown in FIGS. 2A-B).

Preferably, the DBS television receiver systems 710 are tuned to separate television channels 270 (shown in FIGS.

13A-B) as provided by the satellite communication system 250 as the viewing content 210 and can simultaneously process the television channels 270. The DBS television receiver systems 710 can process the television channels 270 in any conventional manner. For example, the DBS television receiver systems 710 can include quadrature phase-shift keying (QPSK) demodulation systems 736 (shown in FIG. 11B) for demodulating the television channels 270. The DBS television receiver systems 710 likewise can provide forward error correction (FEC) to restore the integrity of the television channels 270, as necessary, and can further convert the symbols of the television channels 270 to video and/or audio signals, as desired. The symbols of each television channel 270 preferably can be converted directly to video signals, such as video signals in a National Television System Committee (NTSC) standard format, a Phase Alternating Line (PAL) standard format, and/or a Sequential Couleur Avec Memoire (or Sequential Colour with Memory) (SECAM) standard format, and the associated stereo audio signals.

In the manner discussed above with reference to FIGS. 2A-B, the distribution system 330 can include any conventional type of wired and/or wireless distribution system. Exemplary wireless distribution systems include wireless fidelity (Wi-Fi) networks in accordance with Institute of Electrical and Electronics Engineers (IEEE) Standard 802.11 and/or wireless metropolitan-area networks (MANs), which also are known as WiMax Wireless Broadband, in accordance with IEEE Standard 802.16. Preferably being configured to support high data transfer rates, the distribution system 330 preferably comprises a high-speed Ethernet network, such as any type of Fast Ethernet (such as 100Base-SX and/or 100Base-T) communication network and/or Gigabit (such as 1000Base-SX and/or 1000Base-T) Ethernet communication network. If provided as a wired distribution system, the distribution system 330 can include one or more copper connections and/or fiber optic connections, as desired.

Alternatively, and/or in addition, the universal receiver system 700 be provided in a modular manner to further facilitate reconfiguration of the vehicle information system 300 for international (or multi-regional) usage. The universal receiver system 700 thereby can be reconfigured by replacing one or more of the system modules, requiring minimal manual intervention. Turning to FIG. 11A, for example, the universal receiver system 700 can be provided in the manner set forth above with reference to FIG. 7 and is shown as including at least one DBS television receiver system 710, comprising a plurality of replaceable receiver system modules 720, 730, 740, 760, and 770. As discussed above, the intermediate multiplexer module 720 can receive the incoming pair of converted signals 266A, 266B and distribute the converted signals 266A, 266B among the associated DBS receiver modules 730; whereas, the DBS receiver modules 710 can decode one or more DBS television channels and provide the decoded DBS television channels. The media encoder module 740 can convert the analog audio and/or video outputs of the associated DBS receiver module 730 into the outputted television content 214' for distribution throughout the vehicle information system 300.

The DBS television receiver systems 710 of FIG. 11A likewise is shown as including a MDR host controller (MHC) module 760 for providing a communication interface and controls for the receiver system modules 720, 730, and 740 and a power supply card 770 for providing suitable power to each receiver system module 720, 730, 740, and 760. The receiver system modules 720, 730, 740, 760, and 770 are removable coupled with, and can communicate via, a backplane system 780 in the conventional manner. The backplane system 780 as shown in FIG. 11A can include the Ethernet switch system 750 and can communicate with the remainder of the vehicle information system 300 via an I/O system 790. Operating under the control of the MDR host controller (MHC) module 760, the Ethernet switch system 750 can provide intelligent routing and content control for the outputted television content 214' via the distribution system 330 to each passenger interface 320 (shown in FIGS. 2A-B). Thereby, one or more of the receiver system modules 720, 730, 740, 760, and 770 can be removed and/or replaced to reconfigure the universal receiver system 700 for regional use with minimal manual intervention.

FIG. 11B illustrates a preferred embodiment of the universal receiver system 700, wherein the DBS television receiver systems 710 can support both "free-to-air" (or unencrypted) content and/or premium (or encrypted) content. Each DBS television receiver system 710 preferably is configured to receive pair of converted signals 266A, 266B that includes digital video broadcasting (DVB) television programming content 210' (shown in FIG. 7) and can distribute at least one channel of the television programming content 210' as the outputted television content 214', having a single, fixed-bit rate MPEG-2 transport stream via the distribution system 330. Since the bit rate of the television programming content 210' provided by the satellite communication system 250 (shown in FIG. 7) may be fixed and/or variable.

The bit rate of the distribution stream can be fixed and may be higher or lower than the bit rate of the original satellite broadcast, as desired. Due to limitations on the distribution system 330, the distribution bit rate typically is lower than the satellite broadcast bit rate. The low distribution bit rate in conventional vehicle information systems has prevented large numbers of television channels from being made available to passengers. In contrast, the vehicle information system 300 advantageously reduces hardware, and therefore system weight, and can distribute an increased number of television channels among the passenger interfaces 320 via the relatively low bandwidth distribution system 330.

To distribute an increased number of television channels via the relatively low bandwidth distribution system 330, the architecture of the DBS receiver modules 730 is illustrated in FIG. 11B as including a radio frequency (RF) front end system, such as L-Band front end system 732, and a digital video broadcasting (DVB) tuning system 738. The L-Band front end systems 732 are configured to communicate with a processing system 742, such as one or more digital signal processors (DSPs) 744 and associated memory and logic 746, which, in turn, can communicate with the distribution system 330. Each L-Band front end system 732 likewise can communicate with a radio frequency (RF) tuning system, such as an L-Band tuning system 734, and a quadrature phase-shift keying (QPSK) demodulation system 736.

Each radio frequency (RF) front end system is configured to receive a quadrature phase-shift keying (QPSK) modulated satellite transponder and to present the demodulated data, such as the single channel 269 of direct broadcast satellite (DBS) programming, as an MPEG-2 transport stream for transcoding by the processing system 742 of the media encoder system 740. For each transponder, the processing system 742 can extract a single programming channel 269 from, for example, the incoming MPEG-2 transport stream and can transcode it to an MPEG-2 transport stream of the outputted television content 214' at the distribution bit rate. The resulting MPEG-2 transport streams (one from each L-Band front end system 732) can be multiplexed into a composite MPEG-2 transport stream of outputted television content 214'. The composite MPEG-2 transport stream thereby can be distributed over the distribution system 330 to the passenger interfaces 320.

The multi-regional antenna subsystem 500 and the universal receiver system 700 are illustrated in FIG. 12 as being coupled with an illustrative distribution system 330 for distributing the viewing content 210 throughout a conventional vehicle information system 300 installed in a vehicle 400. Thereby, viewing content 210, including the outputted television content 214' provided by the multi-regional antenna subsystem 500 and the universal receiver system 700, can be distributed to the passenger interfaces 320 for presentation. As shown in FIG. 12, the outputted television content 214' can be provided to the server system 310. The server system 310 can distribute the outputted television content 214' to a plurality of area distribution boxes (ADBs) 370 and, as desired, store the outputted television content 214' via the media (or file) server system 314. The area distribution boxes 370 are distributed throughout the vehicle 400 and are configured to communicate with a plurality of seat electronics boxes (SEBs) 380. The passenger interfaces 320 can receive the outputted television content 214' via an associated seat electronics box 380. The outputted television content 214' thereby can be selected and presented via the passenger interfaces 320 during travel, including international travel Turning to FIG. 13A-B, each satellite communication system 250 can be configured to provide viewing content 210 associated with a plurality of television channels 270. Conventional satellite communication systems 250 typically provide approximately one hundred and fifty television channels 270 of television programming content 210'. The satellite communication system 250A of FIG. 13A, for example, is shown as providing up to M channels 270A-M of television programming content 210; whereas, up to P channels 270A-P of television programming content 210' can be provided via the satellite communication system 250B of FIG. 13B. When the vehicle 400 (shown in FIGS. 2A-B) is within the relevant coverage region 220A, 220B (collectively shown in FIG. 1), the vehicle information system 300 can receive and selectively present the television programming content 210' from the associated satellite communication system 250A, 250B. Any viewing content 210 that is common to the satellite communication systems 250A, 250B preferably is presented via the same viewing channels 714 of the vehicle information system 300.

As shown in FIG. 13A, for example, television programming content 210X' is provided via television channel 270A of the satellite communication system 250A; whereas, television channels 270B, 270C of the satellite communication system 250A respectively provide television programming content 210Y', 210Z'. If the vehicle 400 is within the coverage region 220A of the satellite communication system 250A, the vehicle information system 300 can receive the television programming content 210X', 210Y', and 210Z' in the manner set forth in more detail above. Upon receiving the television programming content 210X', 210Y', and 210Z', the multi-regional antenna subsystem 500 can provide the television programming content 210X', 210Y', and 210Z' to the universal receiver system 700. The universal receiver system 700 is illustrated as providing the television programming content 210X', 210Y', and 210Z' via viewing channels 714B, 714N, AND 714I, respectively.

The television programming content 210X', 210Y', and 210Z' likewise is illustrated in FIG. 13B as being available via the satellite communication system 250B. Stated somewhat differently, the television programming content 210X', 210Y', and 210Z' is common to the satellite communication systems 250A, 250B. As shown in FIG. 13B, the television programming content 210X' is provided via television channel 270J of the satellite communication system 250B; whereas, television channels 270B, 270P of the satellite communication system 250B respectively provide television programming content 210Y', 210Z'. If the vehicle 400 is within the coverage region 220B (shown in FIG. 1) of the satellite communication system 250B, the vehicle information system 300 can receive the television programming content 210X', 210Y', and 210Z' in the manner discussed above. Upon receiving the television programming content 210X', 210Y', and 210Z', the multi-regional antenna subsystem 500 can provide the television programming content 210X', 210Y', and 210Z' to the universal receiver system 700. The universal receiver system 700 is illustrated as again providing the television programming content 210X', 210Y', and 210Z' via the viewing channels 714B, 714N, AND 714I, respectively.

Preferably, the database system 316 (shown in FIG. 7) includes a channel listing (or electronic program guide (EPG)) of the available television channels 270 for each preselected satellite communication system 250. The MDR host controller (MHC) module 760 (shown in FIG. 11A), for example, can receive the electronic program guide (EPG) data that is embedded in the viewing content 210 provided by the relevant satellite communication system 250 via the DBS television receiver systems 710, which can decode electronic program guide (EPG) data. As the vehicle 400 approaches the coverage region 220B, the processor-based subsystem 312 (shown in FIG. 7) therefore can access the channel listing from the database system 316 and can provide appropriate receiver status and control data 216 to instruct the universal receiver system 700. The processor-based subsystem 312 thereby can configure the universal receiver system 700 to select the common television programming content 210X', 210Y', and 210Z' for distribution throughout the vehicle information system 300. The universal receiver system 700 likewise can be configured to distribute the common television programming content 210X', 210Y', and 210Z' via the viewing channels 714B, 714N, AND 714I, respectively. The transition between the coverage region 220A and the coverage region 220B thereby can be conducted in a matter that is transparent to passengers traveling aboard the vehicle 400.

The processor-based subsystem 312 (shown in FIG. 7) (and/or the MDR host controller (MHC) module 760 (shown in FIG. 11A)) preferably can automatically control the routing and distribution of the television programming content 210'. Using the electronic program guide (EPG) data that is provided by the relevant satellite communication system 250, the processor-based subsystem 312 can configure each DBS television receiver system 710 (shown in FIG. 7) to provide the desired television programming content 210' and can maintain an internal television channel map (not shown). By maintaining the internal television channel map, the processor-based subsystem 312 can keep track of the television programming content 210' that is available via the satellite communication system 250.

As discussed above, different satellite communication systems 250 can provide the common television programming content 210X', 210Y', and 210Z', such as Cable News Network (CNN), via different satellite transponder systems. Therefore, when providing antenna control data for directing the multi-regional antenna subsystem 500 toward a different satellite communication system 250, the processor-based subsystem 312 likewise can provide updated television channel mapping data to each DBS television receiver system 710. The DBS television receiver systems 710 thereby can provide the common television programming content 210X', 210Y', and 210Z' to the distribution system 330 for distribution throughout the vehicle information system 300 with limited interruption as the communications with the different satellite communication system 250 are established. Each DBS television receiver system 710 preferably includes an automatic broadcast mapping function for updating the internal television channel map.

In addition to (and/or as an alternative to) presenting the viewing content 210 (or the television programming content 210'), the vehicle information system 300 can be configured to present viewing content indicia 280 via the passenger interfaces 320 as illustrated by FIG. 14. In the manner by set-top boxes (not shown) can present information associated with the viewing content 210 in residences (shown in FIG. 3), the passenger interfaces 320, such as seatback display systems 324, can present the viewing content indicia 280 associated with the viewing content 210 being presented. Illustrative viewing content indicia 280 can include a channel number 280A, content source information 280B, and/or a viewing content description 280C of the viewing content 210. The viewing content indicia 280 can be selected for viewing via the passenger interfaces 320.

Although shown as being presented via an upper portion of the seatback display system 324, it will be appreciated that the viewing content indicia 280 can be presented in any suitable manner. As desired, the viewing content indicia 280 can be presented visually and/or orally via the passenger interfaces 320. One or more messages 290 likewise can be presented in the manner set forth above with reference to the viewing content indicia 280. The messages 290 can include information related to the viewing content 210, such as a potential for a momentary disruption in the viewing content 210 as the vehicle information system acquires a different satellite communication system 250 (shown in FIG. 3). Other messages 290, including travel alerts from the vehicle crew and/or communications from other passengers aboard the vehicle 400, likewise can be presented via the passenger interfaces 320. Exemplary travel alerts can include a "turbulence ahead" alert, a "prepare for landing" alert, and/or a "fasten seatbelts" alert, and preferably cannot be disabled from presentation by the passenger.

The vehicle information system 300 likewise can be configured to receive and selectably present advertising content 210" as illustrated in FIG. 15. The advertising content 210" can be provided in any conventional manner, including in the manner set forth in more detail above with reference to the television content 210' (shown in FIGS. 3 and 5), and can be provided by one or more advertising content providers 230". As shown in FIG. 15, for example, the advertising content provider 230A" provide advertising content 210A"; whereas, advertising content 210B", 210C" are respectively provided via advertising content providers 230B", 230C". The advertising content 210A", 210B", and 210C" is illustrated as being provided to a terrestrial central advertising content server system 238, which can provide the advertising content 210A", 210B", and 210C" as the advertising content 210" to the vehicle information system 300. In the manner discussed above, the central advertising content server system 238 can provide the advertising content 210" to an uplink system 236 for distribution via at least one satellite communication system 250.

Upon receiving the advertising content 210", the vehicle information system 300 can distribute the received advertising content 210" in the manner set forth above with reference to the viewing content 210 (and/or the television content 210'). As desired, the server system 310 of the vehicle information system 300 can include a selected media (or file) server system 314, or advertisement server system 318, for storing the received advertising content 210". The received advertising content 210" can be presented in the manner set forth in more detail above with reference to the viewing content 210 (and/or the television programming content 210' (shown in FIG. 3)) and/or as discussed with regard to the messages 290 (and/or the viewing content indicia 280). Since the television programming content 210' typically includes recurring time slots for transmitted advertising content, the vehicle information system 300 can include selected advertising content 210" in the television programming content 210', substituting the selected advertising content 210" for the transmitted advertising content, as desired.

The advertising content 210", in a preferred embodiment, can include passenger-directed advertising content such as directed advertising content conventionally used in association with the Internet. Stated somewhat differently, the advertising content 210" can be distributed to the passenger interfaces 320 in a dynamic manner. The vehicle information system 300 thereby can select advertising content 210" that is suitable for presentation by each individual passenger interface 320 such that the selected advertising content 210" is more likely to be relevant to the passenger who is using the passenger interface 320. For example, the vehicle information system 300 can select advertising content 210" for presentation via the particular passenger interface 320 based upon the usage of the particular passenger interface 320. The usage of each passenger interface 320 can be associated with one or more selections, such as selections of viewing content 210, made by the relevant passenger. Thereby, each passenger interface 320 can present the select advertising content 210" that is more likely to be relevant to the interests of the associated passenger.

The disclosure is susceptible to various modifications and alternative forms, and specific examples thereof have been shown by way of example in the drawings and are herein described in detail. It should be understood, however, that the disclosure is not to be limited to the particular forms or methods disclosed, but to the contrary, the disclosure is to cover all modifications, equivalents, and alternatives.

What is claimed is:
1. A vehicle information system suitable for presenting direct broadcast satellite (DBS) television content provided via a selected satellite, comprising:
  a multi-regional antenna subsystem for receiving DBS television content from the selected satellite in response to antenna status and control data and having an antenna steering system for directing said multi-regional antenna subsystem toward the selected satellite in response to antenna positioning data;
  an antenna control subsystem for providing the antenna positioning data based upon a comparison of a position of the vehicle information system with a position of the selected satellite and including a predictive process for maintaining a pointing accuracy of said multi-regional antenna subsystem, said predictive process comprising a second-order predictive process for directing said multi-regional antenna subsystem toward the selected satellite based upon rate of position change data;
  a multi-regional receiver subsystem having at least one DBS receiver subsystem for receiving the DBS television content from said multi-regional antenna subsystem via an intermediate multiplexer and for providing a plurality of channels of the DBS television content and at least one encoder for encoding the channels of the DBS television content to provide a plurality of channels of encoded DBS television content for presentation in response to receiver status and control data; and an processor-based subsystem for providing the antenna status and control data and the receiver status and control data each being based upon a comparison of the position of the vehicle information system with contour boundary data for a coverage region of the selected satellite based upon a preselected signal strength.

2. The vehicle information system of claim 1, wherein said processor-based subsystem provides the antenna status and control data to said multi-regional antenna subsystem as the vehicle information system approaches the coverage region.

3. The vehicle information system of claim 1, wherein the antenna status and control data configures said multi-regional antenna subsystem to receive the DBS television content with at least one predetermined reception characteristic.

4. The vehicle information system of claim 3, wherein said at least one predetermined reception characteristic is selected from the group consisting of a signal frequency range and a signal polarization.

5. The vehicle information system of claim 1, wherein said antenna control subsystem continuously provides the antenna positioning data to said multi-regional antenna subsystem.

6. The vehicle information system of claim 1, wherein said processor-based subsystem provides the antenna positioning data to said multi-regional antenna subsystem as the vehicle information system approaches a coverage region associated with the selected satellite.

7. The vehicle information system of claim 1, wherein said antenna control subsystem includes a position system for providing the position of the vehicle information system.

8. The vehicle information system of claim 7, wherein the position system is selected from the group consisting of a Global Positioning Satellite (GPS) system and an Inertial Reference System (IRS).

9. The vehicle information system of claim 1, wherein said antenna control subsystem receives the position of the selected satellite from said processor-based subsystem.

10. The vehicle information system of claim 1, wherein said processor-based subsystem provides the receiver status and control data to said multi-regional receiver subsystem as the vehicle information system approaches a coverage region associated with the selected satellite.

11. The vehicle information system of claim 1, wherein said processor-based subsystem includes a database system for storing information regarding the selected satellite.

12. The vehicle information system of claim 11, wherein said database system stores information regarding a plurality of satellites.

13. The vehicle information system of claim 11, wherein said database system includes information regarding the selected satellite selected from the group consisting of the satellite position data, coverage region data, contour boundary data, transponder frequency data, signal polarization data, symbol rate data, video program identification (PID) data, audio program identification (PID) data, electronic program guide (EPG) data, forward error correction (FEC) data, and Program Clock Reference HD (PCR-PID) data.

14. The vehicle information system of claim 1, wherein the preselected signal strength of the contour boundary data is −48 dBW.

15. The vehicle information system of claim 1, further comprising a down-conversion system for converting the DBS television content provided by said multi-regional receiver subsystem into converted DBS television content having an intermediate frequency, said down-conversion system providing the converted DBS television content to said multi-regional receiver subsystem for processing into the direct broadcast satellite television content.

16. The vehicle information system of claim 15, wherein said down-conversion system converts the DBS television content into the converted DBS television content in response to interface control data provided by said processor-based subsystem based upon said comparison of the position of the vehicle information system with the contour boundary data for the selected satellite.

17. The vehicle information system of claim 16, wherein said processor-based subsystem provides said interface control data to said down-conversion system as the vehicle information system approaches the coverage region for the selected satellite.

18. The vehicle information system of claim 1, wherein said multi-regional receiver subsystem provides the DBS television content to a distribution system.

19. The vehicle information system of claim 1, wherein said multi-regional receiver subsystem comprises a modular multi-regional receiver subsystem in which the at least one DBS receiver subsystem, the intermediate multiplexer, and the at least one encoder comprise replaceable receiver system modules.

20. The vehicle information system of claim 1, wherein the antenna control subsystem maintains communication between the multi-regional antenna subsystem and the satellite without requiring feedback from the multi-regional receiver subsystem.

21. A vehicle information system for installation aboard a passenger vehicle and for presenting direct broadcast satellite (DBS) television content provided via a selected satellite, comprising:

a vehicle position subsystem for providing a vehicle position of the vehicle;

a multi-regional antenna subsystem for receiving DBS television content from the selected satellite in response to antenna status and control data and having an antenna steering system for directing said multi-regional antenna subsystem toward the selected satellite in response to antenna positioning data;

a predictive process for maintaining a pointing accuracy of the multi-regional antenna subsystem and a second-order predictive process for directing the multi-regional antenna subsystem toward the selected satellite based upon rate of position change data;

an antenna control subsystem for providing the antenna positioning data based upon a comparison of said vehicle position with a position of the selected satellite;

a down-conversion subsystem for converting the DBS television content provided by said multi-regional receiver subsystem into converted DBS television content having an intermediate frequency in response to interface control data;

a multi-regional receiver subsystem having at least one DBS receiver subsystem for receiving the converted DBS television content from said down-conversion subsystem via an intermediate multiplexer and for providing a plurality of channels of the DBS television content and at least one encoder for encoding the channels of the DBS television content to provide a plurality of channels of encoded DBS television content for presentation in response to receiver status and control data;

a distribution subsystem for distributing the DBS television content to at least one passenger interface subsystem within the vehicle information system; and an processor-based subsystem for providing the antenna status and control data and the receiver status and control data and having a database system for providing contour boundary data for at least one coverage region associated with a plurality of satellites based upon a preselected signal strength, the antenna status and control data and the receiver status and control data each being based upon a comparison of said vehicle position with the contour boundary data for the selected satellite.

22. The vehicle information system of claim 21, wherein the vehicle information system is disposed aboard an airplane.

23. The vehicle information system of claim 21, wherein said distribution subsystem comprises a wired distribution subsystem.

24. The vehicle information system of claim 23, wherein said wired distribution subsystem supports wired communications having a protocol type selected from the group of protocol standards consisting of Ethernet, Fast Ethernet, and Gigabit Ethernet.

25. The vehicle information system of claim 21, wherein said distribution subsystem comprises a wireless distribution subsystem.

26. The vehicle information system of claim 25, wherein said wireless distribution subsystem supports wireless communications having a protocol type selected from the group of protocol standards consisting of Bluetooth, wireless fidelity (Wi-Fi), Ultra-Wideband (UWB), and IEEE 802.11.

27. The vehicle information system of claim 21, wherein said passenger interface subsystem includes at least one video display system selected from the group consisting of an overhead cabin display system, a seatback display system, and a handheld presentation system.

28. The vehicle information system of claim 21, wherein said passenger interface subsystem includes at least one audio presentation system selected from the group consisting of an overhead speaker system, headphones, and a handheld presentation system.

29. The vehicle information system of claim 21, wherein the antenna control subsystem maintains communication between the multi-regional antenna subsystem and the satellite without requiring feedback from the multi-regional receiver subsystem.

30. An aircraft, comprising:
a fuselage and a plurality of passengers seat arranged within the fuselage; and
a vehicle information system for presenting direct broadcast satellite (DBS) television content provided via a selected satellite, said vehicle information system coupled with said fuselage and comprising:
a vehicle position subsystem for providing a vehicle position of the vehicle;
a multi-regional antenna subsystem for receiving DBS television content from the selected satellite in response to antenna status and control data and having an antenna steering system for directing said multi-regional antenna subsystem toward the selected satellite in response to antenna positioning data;
a predictive process for maintaining a pointing accuracy of the multi-regional antenna subsystem and a second-order predictive process for directing the multi-regional antenna subsystem toward the selected satellite based upon rate of position change data;
an antenna control subsystem for providing the antenna positioning data based upon a comparison of said vehicle position with a position of the selected satellite;
a multi-regional receiver subsystem having at least one DBS receiver subsystem for receiving converted DBS television content from said multi-regional antenna subsystem via an intermediate multiplexer and for providing a plurality of channels of the DBS television content and at least one encoder for encoding the channels of the DBS television content to provide a plurality of channels of encoded DBS television content for presentation in response to receiver status and control data;
a passenger interface subsystem for presenting the DBS television content distributed via a distribution subsystem; and
an processor-based subsystem for providing the antenna status and control data and the receiver status and control data and having a database system for providing contour boundary data for at least one coverage region associated with a plurality of satellites based upon a preselected signal strength, the antenna status and control data and the receiver status and control data each being based upon a comparison of said vehicle position with the contour boundary data for the selected satellite.

31. A method for presenting direct broadcast satellite (DBS) television content provided via a selected satellite, comprising:
providing an information system having a multi-regional antenna subsystem and a multi-regional receiver subsystem;
determining a position of the vehicle information system;
comparing the position of the vehicle information system with a position of the selected satellite to provide antenna positioning data;
comparing the position of the vehicle information system with contour boundary data for the selected satellite to provide antenna status and control data and receiver status and control data, the contour boundary data defining a coverage region of the selected satellite based upon a preselected signal strength;
directing the multi-regional antenna subsystem toward the selected satellite in response to the antenna positioning data;
maintaining a pointing accuracy of the multi-regional antenna subsystem via a second-order predictive process for directing the multi-regional antenna subsystem toward the selected satellite based upon rate of position change data;
configuring the multi-regional antenna subsystem to receive DBS television content from the selected satellite in response to the antenna status and control data;
configuring the multi-regional receiver subsystem to process the received DBS television content in response to the receiver status and control data;
receiving the DBS television content via the multi-regional antenna subsystem;
selecting a relevant portion of the DBS television content;
generating a plurality of channels from the selected DBS television content;
encoding the channels to provide a plurality of channels of encoded DBS television content; and
providing the channels of encoded DBS television content for presentation.

32. The method of claim 31, wherein said directing the multi-regional antenna subsystem comprises directing the multi-regional antenna subsystem as the multi-regional antenna subsystem approaches a coverage region associated with the selected satellite.

33. The method of claim 31, wherein said configuring the multi-regional antenna subsystem includes configuring the multi-regional antenna subsystem to receive the DBS television content with at least one predetermined reception characteristic.

34. The method of claim 33, wherein said configuring the multi-regional antenna subsystem includes configuring the multi-regional antenna subsystem to receive the DBS television content with said at least one predetermined reception characteristic being selected from the group consisting of a signal frequency range and a signal polarization.

35. The method of claim 31, wherein said directing the multi-regional antenna subsystem includes continuously providing the antenna positioning data to the multi-regional antenna subsystem and continuously positioning the multi-regional antenna subsystem.

36. The method of claim 31, wherein said directing the multi-regional antenna subsystem includes providing the antenna positioning data to the multi-regional antenna subsystem as the multi-regional antenna subsystem approaches a coverage region associated with the selected satellite.

37. The method of claim 31, wherein said configuring the multi-regional receiver subsystem includes configuring the multi-regional receiver subsystem to process the received DBS television content as the multi-regional receiver subsystem approaches a coverage region associated with the selected satellite.

38. The method of claim 31, further comprising converting the received DBS television content into converted DBS television content having an intermediate frequency and providing the converted DBS television content to the multi-regional receiver subsystem for processing into the direct broadcast satellite television content.

39. The method of claim 38, wherein said converting the received DBS television content includes converting the received DBS television content in response to the antenna status and control data.

40. The method of claim 31, further comprising distributing the DBS television content to at least one passenger interface subsystem.

41. The method of claim 31, wherein said providing the multi-regional antenna subsystem and the multi-regional receiver subsystem includes disposing the multi-regional antenna subsystem and the multi-regional receiver subsystem aboard a vehicle.

42. The method of claim 31; further comprising calibrating the multi-regional antenna subsystem.

43. The method of claim 42, wherein said calibrating the multi-regional antenna subsystem comprises automatically calibrating the multi-regional antenna subsystem.

44. The method of claim 42, wherein said calibrating the multi-regional antenna subsystem includes sampling the DBS television content received from the selected satellite at a plurality of different orientations of the multi-regional antenna subsystem.

45. The method of claim 44, wherein said calibrating the multi-regional antenna subsystem includes sampling the DBS television content at three different orientations of the multi-regional antenna subsystem.

46. The method of claim 44, wherein said calibrating the multi-regional antenna subsystem includes sampling the DBS television content at said different orientations, which are separated by an angular displacement at least ninety degrees.

47. The method of claim 44, wherein said calibrating the multi-regional antenna subsystem includes measuring a signal strength of the DBS television content at each of said orientations of the multi-regional antenna subsystem.

48. The method of claim 31, further comprising maintaining communication between the multi-regional antenna subsystem and the satellite without requiring feedback from the multi-regional receiver subsystem.

49. A computer program product for presenting direct broadcast satellite (DBS) television content via a vehicle information system having a multi-regional antenna subsystem and a multi-regional receiver subsystem for receiving the DBS television content from a selected satellite, the computer program product being encoded on one or more machine-readable storage media and comprising:
    instruction for determining a position of the vehicle information system;
    instruction for comparing the position of the vehicle information system with a position of the selected satellite to provide antenna positioning data;
    instruction for comparing the position of the vehicle information system with contour boundary data for the selected satellite to provide antenna status and control data and receiver status and control data, the contour boundary data defining a coverage region of the selected satellite based upon a preselected signal strength;
    instruction for directing the multi-regional antenna subsystem toward the selected satellite in response to the antenna positioning data;
    instruction for maintaining a pointing accuracy of the multi-regional antenna subsystem via a predictive process, and wherein said instruction for maintaining said pointing accuracy of the multi-regional antenna subsystem includes instruction for maintaining said pointing accuracy of the multi-regional antenna subsystem via a second-order predictive process for directing the multi-regional antenna subsystem toward the selected satellite based upon rate of position change data;
    instruction for configuring the multi-regional antenna subsystem to receive DBS television content from the selected satellite in response to the antenna status and control data;
    instruction for configuring the multi-regional receiver subsystem to process the received DBS television content in response to the receiver status and control data;
    instruction for receiving the DBS television content via the multi-regional antenna subsystem;
    instruction for selecting a relevant portion of the DBS television content;
    instruction for generating a plurality of channels from the selected DBS television content;
    instruction for encoding the channels to provide a plurality of channels of encoded DBS television content; and
    instruction for providing the channels of encoded DBS television content for presentation.

50. The computer program product of claim 49, wherein said instruction for directing the multi-regional antenna subsystem comprises instruction for directing the multi-regional antenna subsystem as the multi-regional antenna subsystem approaches a coverage region associated with the selected satellite.

51. The computer program product of claim 49, wherein said instruction for configuring the multi-regional antenna subsystem includes instruction for configuring the multi-regional antenna subsystem to receive the DBS television content with at least one predetermined reception characteristic.

52. The computer program product of claim 51, wherein said instruction for configuring the multi-regional antenna subsystem includes instruction for configuring the multi-regional antenna subsystem to receive the DBS television content with said at least one predetermined reception characteristic being selected from the group consisting of a signal frequency range and a signal polarization.

53. The computer program product of claim 49, wherein said instruction for positioning the multi-regional antenna subsystem includes instruction for continuously providing the antenna positioning data to the multi-regional antenna subsystem and instruction for continuously positioning the multi-regional antenna subsystem.

54. The computer program product of claim 49, wherein said instruction for positioning the multi-regional antenna subsystem includes instruction for providing the antenna positioning data to the multi-regional antenna subsystem as the multi-regional antenna subsystem approaches a coverage region associated with the selected satellite.

55. The computer program product of claim 49, wherein said instruction for configuring the multi-regional receiver subsystem includes instruction for configuring the multi-regional receiver subsystem to process the received DBS television content as the multi-regional receiver subsystem approaches a coverage region associated with the selected satellite.

56. The computer program product of claim 49, further comprising instruction for converting the received DBS television content into converted DBS television content having an intermediate frequency and instruction for providing the converted DBS television content to the multi-regional receiver subsystem for processing into the direct broadcast satellite television content.

57. The computer program product of claim 56, wherein said instruction for converting the received DBS television content includes instruction for converting the received DBS television content in response to the antenna status and control data.

58. The computer program product of claim 49, further comprising instruction for distributing the DBS television content to at least one passenger interface subsystem.

59. The computer program product of claim 49, further comprising instruction for calibrating the multi-regional antenna subsystem.

60. The computer program product of claim 59, wherein said instruction for calibrating the multi-regional antenna subsystem comprises instruction for automatically calibrating the multi-regional antenna subsystem.

61. The computer program product of claim 59, wherein said instruction for calibrating the multi-regional antenna subsystem includes instruction for sampling the DBS television content received from the selected satellite at a plurality of different orientations of the multi-regional antenna subsystem.

62. The computer program product of claim 61, wherein said instruction for calibrating the multi-regional antenna subsystem includes instruction for sampling the DBS television content at three different orientations of the multi-regional antenna subsystem.

63. The computer program product of claim 61, wherein said instruction for calibrating the multi-regional antenna subsystem includes instruction for sampling the DBS television content at said different orientations, which are separated by an angular displacement at least ninety degrees.

64. The computer program product of claim 61, wherein said instruction for calibrating the multi-regional antenna subsystem includes instruction for measuring a signal strength of the DBS television content at each of said orientations of the multi-regional antenna subsystem.

65. The computer program product of claim 49, further comprising instruction for maintaining communication between the multi-regional antenna subsystem and the satellite without requiring feedback from the multi-regional receiver subsystem.

* * * * *